US007148995B2

(12) United States Patent
Martinez et al.

(10) Patent No.: US 7,148,995 B2
(45) Date of Patent: Dec. 12, 2006

(54) PRINTING ADJUSTMENT SYSTEM AND METHOD

(75) Inventors: Henry Martinez, Dallas, TX (US); Barry W. Krause, Dallas, TX (US); Charles Martinez, Dallas, TX (US)

(73) Assignee: The Ackley Martinez Company, Dallas, TX (US)

( * ) Notice: Subject to any disclaimer, the term of this patent is extended or adjusted under 35 U.S.C. 154(b) by 1117 days.

(21) Appl. No.: 10/086,080

(22) Filed: Feb. 27, 2002

(65) Prior Publication Data

US 2003/0058462 A1 Mar. 27, 2003

Related U.S. Application Data

(60) Provisional application No. 60/272,914, filed on Mar. 2, 2001.

(51) Int. Cl.

| | |
|---|---|
| ***H04N 1/405*** | (2006.01) |
| ***H04N 1/407*** | (2006.01) |
| ***H04N 1/52*** | (2006.01) |
| ***H04N 1/60*** | (2006.01) |
| ***B41M 1/14*** | (2006.01) |

(52) U.S. Cl. .................... 358/1.9; 358/3.06; 358/3.26; 358/521; 358/525; 358/536; 358/504; 358/406; 101/211

(58) Field of Classification Search ................ 358/1.9, 358/3.06, 3.21, 3.24, 3.26, 504, 406, 518–521, 358/534–536, 525; 101/335, 365, 484, 171, 101/211; 382/112, 274, 162, 167, 169
See application file for complete search history.

(56) References Cited

U.S. PATENT DOCUMENTS

| | | | | |
|---|---|---|---|---|
| 3,926,117 | A | 12/1975 | Milligan | 101/211 |
| 3,951,668 | A | 4/1976 | Schumacher et al. | 101/211 |
| 4,656,941 | A | 4/1987 | Brovman | 101/483 |
| 4,665,496 | A | 5/1987 | Ott | 382/112 |
| 4,706,206 | A | 11/1987 | Benoit et al. | 382/167 |
| 4,717,954 | A | 1/1988 | Fujita et al. | 358/534 |
| 4,852,485 | A | 8/1989 | Brunner | 101/211 |
| 4,878,977 | A | 11/1989 | Kueppers | 101/211 |
| 4,881,181 | A | 11/1989 | Jeschke et al. | 358/1.9 |
| 4,924,323 | A | 5/1990 | Numakura et al. | 382/169 |
| 4,944,746 | A | 7/1990 | Iwata et al. | |

(Continued)

OTHER PUBLICATIONS

"Stochastic Screening," promotional material from website of Edward Enterprises, Inc. (© 1995-1999).

(Continued)

*Primary Examiner*—Scott A. Rogers
(74) *Attorney, Agent, or Firm*—Haynes and Boone, LLP

(57) ABSTRACT

A printing adjustment method includes providing a plurality of solid and screened density values produced by a proofing device that represent intended density values. The method also includes providing a plurality of solid and screened density values produced by a press output device. The method also provides calculating, in response to selected ones of the plurality of density values produced by the press output device and selected ones of the plurality of density values produced by the proofing device, required percent dot values to be used to print on the press output device a plurality of adjusted density values that approximately correspond to the intended density values. In a particular embodiment, the plurality of solid density values produced by the press output device are varied approximately linearly in density along a first axis, the first axis approximately perpendicular to direction in which output of the press output device is produced.

54 Claims, 16 Drawing Sheets

U.S. PATENT DOCUMENTS

| | | | | |
|---|---|---|---|---|
| 4,947,746 | A | 8/1990 | Jeschke et al. | |
| 4,975,862 | A | 12/1990 | Keller et al. | 382/112 |
| 5,068,810 | A | 11/1991 | Ott | 382/112 |
| 5,122,977 | A | 6/1992 | Pfeiffer | 101/211 |
| 5,163,012 | A | 11/1992 | Wuhrl et al. | 382/112 |
| 5,224,421 | A | 7/1993 | Doherty | 101/211 |
| 5,255,085 | A * | 10/1993 | Spence | 358/527 |
| 5,293,539 | A | 3/1994 | Spence | 358/527 |
| 5,309,246 | A * | 5/1994 | Barry et al. | 358/1.9 |
| 5,315,380 | A | 5/1994 | Ingraham et al. | 358/500 |
| 5,317,425 | A | 5/1994 | Spence et al. | 358/504 |
| 5,333,069 | A | 7/1994 | Spence | 358/518 |
| 5,343,234 | A | 8/1994 | Kuehnle | 347/128 |
| 5,432,892 | A | 7/1995 | Hafner et al. | 708/290 |
| 5,493,321 | A | 2/1996 | Zwadlo | 347/131 |
| 5,528,377 | A | 6/1996 | Hutcheson | 358/1.9 |
| 5,572,340 | A | 11/1996 | Eckhardt et al. | 358/518 |
| 5,578,824 | A | 11/1996 | Koguchi et al. | 250/318 |
| 5,579,044 | A | 11/1996 | Warner et al. | 347/236 |
| 5,598,272 | A | 1/1997 | Fisch et al. | 358/1.9 |
| 5,615,282 | A | 3/1997 | Spiegel et al. | 382/167 |
| 5,636,330 | A | 6/1997 | Barak | 358/1.9 |
| 5,676,887 | A | 10/1997 | Soeda et al. | |
| 5,677,967 | A | 10/1997 | Pariser | 382/167 |
| 5,687,300 | A | 11/1997 | Cooper | 358/1.9 |
| 5,721,811 | A | 2/1998 | Eckhardt et al. | 358/1.9 |
| 5,734,800 | A | 3/1998 | Herbert et al. | 358/1.9 |
| 5,745,120 | A | 4/1998 | De Baer et al. | 345/590 |
| 5,754,448 | A | 5/1998 | Edge et al. | 358/518 |
| 5,761,327 | A | 6/1998 | Papritz | 382/112 |
| 5,781,206 | A | 7/1998 | Edge | 347/19 |
| 5,816,151 | A | 10/1998 | Wang et al. | 101/171 |
| 5,832,109 | A | 11/1998 | Mahy | 382/162 |
| 5,835,244 | A | 11/1998 | Bestmann | 358/523 |
| 5,870,530 | A | 2/1999 | Balasubramanian | 358/1.9 |
| 5,877,787 | A | 3/1999 | Edge | 347/19 |
| 5,892,891 | A | 4/1999 | Dalal et al. | 358/1.9 |
| 5,947,029 | A | 9/1999 | Loeffler et al. | 101/484 |
| 5,957,049 | A | 9/1999 | Ammeter et al. | 101/211 |
| 5,967,050 | A | 10/1999 | Seymour | 101/484 |
| 5,988,067 | A | 11/1999 | Ishida et al. | 101/484 |
| 5,995,655 | A | 11/1999 | Lockett et al. | 382/162 |
| 6,027,201 | A | 2/2000 | Edge | 347/19 |
| 6,041,708 | A | 3/2000 | Kipphan et al. | 101/365 |
| 6,043,909 | A | 3/2000 | Holub | 358/504 |
| 6,983,695 | B1 * | 1/2006 | Mogi et al. | 101/484 |
| 2005/0134872 | A1 * | 6/2005 | Maki | 358/1.9 |

OTHER PUBLICATIONS

*SWOP* (Specifications Web Offset Publications), Eighth Edition, by SWOP, Inc., NY, NY (1997).

Davis, M. and Davison, B., "Calculating the 'Net' Effect," *Publishing & Production Executive,* pp. 25-32 (Aug. 1997).

"Graphic technology—Colour and transparency of ink sets for four-colour-printing," Part I: Sheet-fed and heat-set web offset lithographic printing, *International Standard* (ISO 2846-1:1997(E)), First Edition, pp. 1-19 (Dec. 15, 1997).

Moretta, R., "Process Workflow White Paper, The easiest way to achieve brilliant results," *PANTONE® Hexachrome®* † (Mar. 1998).

*The Color Guide and Glossary,* X-Rite, Incorporated, Grandville, Michigan (1998).

Adams, R. and Romano, F., *Computer-to-Plate Primer,* GATF*Press,* Pittsburgh (1999).

*General Requirements for Applications in Offset Lithography* (GRACoL™), Version 3.0, by Graphic Communications Association (© 1999).

Fenton, H., adaption of article "Process Control: Missing LINK In," *Graphic Arts Monthly*/www.gammag.com, pp. 64-70 (Oct. 1999).

"Staccato Stochastic Screening Technology," promotional material from website of Creo Products, Inc. (© 2000).

Kohler, T., "ICC Achievements and Challenges," from website http://www.color.org/iccachl.html of Canon Information Systems.

"Harmony, Flexible Dot Gain Calibration Harmony Advantages," promotional material from website of Creo Products, Inc.

* cited by examiner

PRINTING ADJUSTMENT SYSTEM AND METHOD

CROSS-REFERENCE TO RELATED APPLICATIONS

This patent application claims the benefit of Provisional Patent Application, Ser. No. 60/272,914, entitled *Printing Adjustment System and Method*, filed on Mar. 2, 2001, the disclosure of which is incorporated herein by reference.

TECHNICAL FIELD OF THE INVENTION

This invention relates in general to the field of printing and, more particularly, to a printing adjustment system and method.

BACKGROUND OF THE INVENTION

Full-color printing on offset presses has become relatively reliable and affordable for clients long accustomed to printing in black and white or with just one or two pre-mixed spot inks. Such printing utilizes photo-chemical processes to reduce original multi-colored materials to the four constituent colors used in printing. For example, printed color images combine different intensities of four basic colors—Magenta ("M"), Yellow ("Y"), Cyan ("C"), and Black ("K")—using a printing process known as four-color-process printing. In practice, accurately printing a color image to a customer's satisfaction is often times tedious, problematic and time consuming, as it usually requires manual intervention. For example, conventional four-color-process printing usually utilizes presses that are only designed to either apply or not apply a single amount of ink to any given location on a page. To reduce the number of errors and expenses associated with errors in acceptable print quality off the press, proofs are usually used.

Four-color-process printing requires a reliable color proof for use as a guide for press operators and customers in finalizing a printing press to perform a production print job. For example, the proof conveniently and inexpensively provides one set of values for each of the print colors to be used on the production print job, and an easily-changed and viewable image for both the press operator and the customer. A single piece of film for each of the four colors is also required by platemaker to make thin printing plates that are wrapped on the drums of the printing press, covered with the appropriate inks, and then offsets from blankets are rolled over sheets of paper during the printing process. Computer-to-Plate (CTP) technology can eliminate the need for film in the plate-creation process. Unfortunately, a proof includes inherent tone and color differences from a press sheet, and a great deal of time is consumed in assessing how to improve the coincidence of the tone and color reproduction characteristics of a proofing system to those of a press.

Specifications for Web Offset Publication ("SWOP") provide the official set of standards for the publication printing industry and also have become a defacto standard used by the remainder of printing industry. Among other things, SWOP specifies the density or degree of light absorption, in an area that prints solid for the C, M, Y, K proofing colorants and printing inks (collectively "the colorants") and also specifies a tonal appearance weight that should appear in an area that prints 50% screened. This tonal appearance weight is impacted not only by a printing device's reproduction characteristics, but also by density values of printed solid areas. This density value is typically varied by varying an ink-film thickness.

The SWOP specification for a 50% screened area is stated in terms of dot gain, which represents a difference in dot area between an input film printing dot area and the apparent dot area measured on a printed sheet. The computed value includes both physical changes in dot size and optical effects that increase the apparent size of the printed dot. For example, high dot gain value is intended to indicate higher tonal appearance weight and a low dot gain value is intended to represent lower tonal appearance weight. However, because dot gain is a value expressed as a measure relative to a specific solid density value, dot gain is always measured by first measuring a solid area, in close proximity to the 50% screened area, followed by measurement of that screened area. For example, a 50% dot area having an apparent dot area value of 72% is said to have a 22% dot gain.

Unfortunately, dot gain does not necessarily provide a reliable measurement in many applications. For example, a measured 22% dot gain for a 50% dot area may actually have a variety of screened area density values as compared to the solid density values that were measured. For example, solid density regions of 1.50, 1.30, and 1.10 may all actually yield the same 22% dot gain for screened area densities of 0.52, 0.50, and 0.47, respectively. These dot gain measurements may be obtained from the solid density measurements by a variety of methods, including using Murray-Davies equations. Thus, unfortunately, it is not easy to discern which of two or more dot gain values has the highest or lowest tonal appearance weight when the solid densities related to the 50% screened areas have solid density values that differ from each other.

Dot gain measurement data also falls short as a method to mathematically calculate differences between device reproduction characteristics, because it is highly unlikely that both processes will have similar solid density values for a given measurement. Subsequently, because dot gain does not provide an absolute measured value, it does not provide a good basis for use in calculating precise transformation factors to be performed on individual color channels without considering interaction between the color channels (one-dimensional transformation factors).

Most current press operations provide one-dimensional control (where colorants do not overlap when printed on a substrate such as paper) by using SWOP-certified proofing systems with the proper solid density requirements and the specified dot-gain-at-50% values when properly exposed. Typical press operational control of one-dimensional characteristics is achieved by proper selection, and controlled use, of elements such as paper, inks, plates, fountain solutions, image transferring cylinder blankets, press mechanical settings and ambient moisture/temperature conditions, among others. In addition, CTP technology may be utilized to gain more precise control of the tonal scale of each of the C, M, Y, K colorants. For example, in the process of making plates by computer controlled laser exposure, image data may be transformed as each plate is made to make every plate's image tone reproduction precisely fit the need of the particular press on which it will be used.

Unfortunately, in many cases results produced even after managing these press operations are often unacceptable. These inaccurate results may be caused by, among other things, an inability to precisely control solid density and dot-gain-at-50% on presses which are not always capable of meeting SWOP specifications. These inaccurate results may also appear when, even after adjustments have been made to achieve "proper" solid density requirements and specified dot-gain-at-50% values, other screened areas, such as the 5%, 10%, 25%, 75%, and 90%, still do not correspond to prepress proofing values. Moreover, the process of obtaining accurate results increases in complexity across production print jobs, because the subject matter printed on the press, especially customer-designated 'crucial colors,' changes with each production print job. Acceptance of each production print job usually involves a customer's subjective assessment as to whether these crucial colors printed on the press correspond to prepress proofing values, rather than any measurable or objective assessment.

Furthermore, many fluctuations in press printing conditions' printing characteristics including, but not limited to, variations due to paper/base substrates, inks, plates, fountain solutions, image transferring cylinder blankets, press mechanical settings and ambient moisture/temperature conditions may change batch-to-batch or day-to-day. These fluctuations usually affect the printing device's reproduction characteristics during each production print job. Unfortunately, it is not practical to track down these causes of day-to-day or batch-to-batch variations and correct them before running a production print job. The traditional approach to accommodate these variations is to adjust ink film thickness, which usually accommodates one area at the expense of others. The print buyer is thus usually forced to compromise quality. Traditional press check procedures, which include a press operator's subjective color adjusting to meet a customer's needs, also offer no objective feedback to aid the decision-making process prior to doing the adjusting.

In addition, traditional make-ready procedures are often burdensome and waste precious time and resources. For example, these procedures usually include tasks that are done iteratively for each press sheet randomly selected for evaluation until the procedure achieves settings required for that production run. These tasks usually include using a color bar with color samples distributed without any defined spatial relationship to either a particular reference point or to ink fountain zone controls, taking measurements by a hand-held device, and manually annotating, directly on the press sheet being evaluated, density readings in close proximity to color samples. These tasks also include informal selection of target solid density aimpoints and tolerances for variation, usually by the press operator. Then a determination is usually made as to whether, and to what degree, any adjustments are required.

Usually the densities that have provided the most recent best results are used as the chosen targets. In addition, if the adjustment on the press is being done by remote control at the press console, the press operator aligns the press sheet with the scale on the press console representing the array of ink fountain zone controls, and visually translates color sample positions into ink fountain zone control positions. The operator then uses his own subjective experience to translate these annotations into ink control settings and makes adjustments by executing commands on the console's remote controls (such as by pushing buttons and observing the console's display). On the other hand, if the adjustment on the press is being done directly on the ink fountain by manually operating the mechanisms, the press operator carries the annotated press sheet to the vicinity of each ink fountain of each printing unit, aligns the press sheet to the ink fountain zone controls, visually translates color sample positions into ink fountain zone control positions, similarly translates these annotations into ink control settings, and makes the adjustments by exerting force to the mechanisms (such as by turning screws). Unfortunately, these efforts to achieve the targeted solid density aimpoints during the press make-ready phase are usually abandoned early in the process and replaced during the press check phase with the goal of simply making the color of a printed sheet look like the color on a proof by regulating the ink film thickness in selected areas across the sheet. This process is both burdensome and wastes time and materials.

There have been some recently developed methods of performing make-ready procedures, including those described in U.S. Pat. Nos. 4,881,181, and 4,947,746. Unfortunately, these methods typically require detailed setup by operators using methods that relate to a particular printing press or press model and a particular color bar that may be used for the particular printing press or press model. These systems also typically require entries for the quantity of ink fountain zone controls and the positions for each of the centerpoints of these ink fountain zone controls, which may approximate 30 entries on a 40 inch press. These systems may also typically require entries for the position of each of the color measurement samples, which may approximate 30 per color, or 120 entries on a four-color 40 inch press. In addition, these methods require distance measurements of the color samples' relation to an exact reference point such as the center of a printing press. As a result, these methods may consume valuable resources involved in providing adjustments to ink fountain zone controls. Such methods require a great deal of time and may also be subject to errors resulting from these setup procedures.

SUMMARY OF THE INVENTION

From the foregoing, it may be appreciated that a need has arisen for a printing adjustment system and method. In accordance with teachings of the present invention, a system and method are provided that may substantially reduce or eliminate disadvantages and problems of conventional printing systems.

One aspect of the invention is a printing adjustment method that includes providing a plurality of solid and screened density values produced by a proofing device that represent intended density values. The method also includes providing a plurality of solid and screened density values produced by a press output device. The method also provides calculating, in response to selected ones of the plurality of density values produced by the press output device and selected ones of the plurality of density values produced by the proofing device, required percent dot values to be used to print on the press output device a plurality of adjusted density values that approximately correspond to the intended density values. In a particular embodiment, the plurality of solid density values produced by the press output device are varied approximately linearly in density along a first axis, the first axis approximately perpendicular to direction in which output of the press output device is produced.

Also in a particular embodiment, the step of calculating may also include selecting from the plurality of solid density values produced by the press output device values that approximately correspond to solid density aimpoints, providing a statistical representation of the selected values, performing a regression analysis of the selected values that approximately correspond to solid density aimpoints, and using ones of the plurality of solid density values produced by the press output device that approximately correspond to the selected values that approximately correspond to solid density aimpoints. The step of calculating may also include applying first adjustments to at least one of the density values produced by the press output device, in response to the regression analysis and at least one of the density values produced by the proofing device. The step of calculating may also include using interpolation in response to the first adjustments to provide the required percent dot values.

Another aspect of the invention is a printing adjustment data form, which includes a plurality of solid color control regions, produced by a press output device, which correspond to positions approximately along an axis, and a plurality of screened color control regions produced by the press output device. Density values for at least two of the plurality of solid color control regions are intentionally varied using predetermined values along the axis. In a particular embodiment, the density values are varied approximately linearly along the axis. In another embodiment, the density values are varied by regulating ink-film thickness along the axis.

Another aspect of the invention is a printing adjustment system, which includes a press output device operable to print image data having density values and a computer operable to provide input data to the press output device. The computer is further operable to read a plurality of solid and screened density values produced by a proofing device that represent intended density values and read a plurality of solid and screened density values produced by the press output device. The computer is also further operable to calculate, in response to selected ones of the plurality of density values produced by the press output device and selected ones of the plurality of density values produced by the proofing device, required percent dot values to be used to print on the press output device a plurality of adjusted density values that approximately correspond to the intended density values.

Another aspect of the invention is a printing adjustment application, which includes a computer-readable medium and software residing on the computer-readable medium. The software is operable to determine a mathematical relationship between a density value of a first plurality of solid color regions of image data produced by a press output device and a density value of a plurality of screened color regions of image data produced by the press output device. The first plurality of solid color regions of image data produced by the press output device are intentionally varied using predetermined values. The software is further operable to adjust, in response to the mathematical relationship, the density value of the plurality of screened color regions of image data produced by the press output device and a density value of ones of a second plurality of solid color regions of image data produced by a press output device selected in response to a plurality of solid color regions of image data produced by a proofing device. The plurality of solid color regions of image data produced by the proofing device represent intended density values. The software is further operable to interpolate by adjusting at least one of the plurality of screened color regions of image data produced by the press output device in response to an amount proportional to a product of a first value and a second value. The first value is a difference between percent dot values of two of the plurality of screened color regions of image data produced by the press output device, and the second value is a ratio of a difference between at least one of the intended density values and one of the two of the plurality of screened color regions of image data produced by the press output device to the difference between the two of the plurality of screened color regions of image data produced by the press output device. The software is further operable to determine a required percent dot value in response to the interpolation, the required percent dot value operable to cause the color density value of at least one of the regions of the image data produced by the press output device to approach the intended density values of the corresponding region produced by the proofing device.

Another aspect of the invention is a printed image, which includes a substrate and image data. The image data is produced by a press output device residing on the substrate, and produced in response to required percent dot values automatically calculated in response to selected ones of a first plurality of solid and screened density values representing intended density values and selected ones of a second plurality of solid and screened density values. The required percent dot values produced by the press output device provide adjusted density values that approximately correspond to the intended density values. The first plurality of solid and screened density values is produced by a proofing device and the second plurality of solid and screened density values is produced by the press output device Another aspect of the invention is a printing adjustment method that includes providing a first plurality of solid and screened density values produced by a press output device and providing a second plurality of solid and screened density values. The method also includes automatically calculating density variance data between a statistical representation of at least a subset of the first plurality of solid and screened density values and corresponding representations of ones of at least a subset of the second plurality of solid and screened density values, the density variance data operable to be used to automatically calculate tonal reproduction adjustment values to produce data on the press output device before performing a print production run.

Another aspect of the invention is a printing adjustment method that includes providing press profile data from a press output device and providing proofing device profile data. The method also includes automatically, when desired, calculating adjustment values in density that correspond to percent data values to be printed on the press output device in response to at least one of the group consisting of the press profile data and the proofing device profile data, the adjustment values operable to reduce effects on image data produced by the press output device, the effects resulting from fluctuations in at least one of printing press and peripheral printing conditions' printing characteristics.

Another aspect of the invention is a printing adjustment method that includes providing a plurality of segments produced by a press output device having a plurality of ink fountain zone controls, each of the segments having a width, a plurality of segment solid density color values each having an offset value measurable as a fraction of the width, and a segment center. The method also includes identifying at least a portion of the segments as encompassed segments relative to designated copy matter to be printed by the press output device, the encompassed segments having a first end segment and a second end segment. The method also includes calculating color density variations for at least a portion of the plurality of segment solid density color values. The method also includes calculating, in response to the offset values and at least a portion of the color density variations, adjustment data for at least one of the ink fountain zone controls, the adjustment data operable to be used to adjust ink deliverable by the ink fountain zone control.

The invention provides several important advantages. Various embodiments of the invention may have none, some, or all of these advantages. For example, the invention provides a method for gathering data that is representative of and provides more control of a press' characteristics in reproducing tonal screened areas as the solid ink density is regulated across the cylinder of the press. The density may be regulated to meet specifications for low-level, mid-level, and high-level solid density aimpoints with transitions between the aimpoints that may be approximately linear. Such an advantage provides substantially representative characteristics of a full tonal scale (1–100%) for press conditions, and the ability to provide factors that may be applied at a computer-to-plate (CTP) or direct imaging press production phase. In other words, the accuracy with which an appearance of a print production job (press output data or print sheet) may match the output of a proofing device, whether digital or otherwise (a proof), may be improved.

The invention may also provide the advantage of using color bar segments to apply color adjustments to tonal reproduction characteristics, which provides acceptable color approval at a press check phase of production. Such an advantage may eliminate the sole reliance upon the manipulation of ink film thickness that is typically required in other conventional systems to alter tonal color areas, and which compromises printed images solid and near solid areas as other tonal areas are adjusted.

Another technical advantage of the invention is that the invention may also compensate for fluctuations in printing press and peripheral printing conditions' printing characteristics that affect the printing device's reproduction characteristics. These fluctuations include, but are not limited to, variations due to paper/base substrates, inks, plates, fountain solutions, image transferring cylinder blankets, press mechanical settings, ambient air conditions, ambient moisture conditions, ambient temperature conditions, and chemical residue conditions, which may change batch-to-batch or day-to-day. These include, but are not limited to fluctuations in chemical residue conditions such as plate or blanket wash chemistry, roller residue, wear and tear on press components, and a variety of ambient air conditions. Such an advantage may improve the accuracy with which the reproduction characteristics of a printing device may be measured, and subsequently with which the appearance of press output data may be matched to a proof. In a particular embodiment, these fluctuations may be compensated for by using Interim Press Profile Adjustments.

Still another technical advantage of the invention is that the invention also may utilize regression equations that may be used to calculate more precise tonal, or screened, color density values. Such an advantage may also improve the accuracy with which the appearance of press output data may be matched to a proof. Yet another technical advantage of the invention is that the invention may also provide color bar segments that may be used to provide color measurements that may be compared to desired aimpoints, and calculations are made of density variations, which may be recorded and reported. For example, use of the invention does not require annotations of density readings by hand. Moreover, use of aspects of the invention provide precise density variations specifically related to each ink fountain zone control, while eliminating traditional methods' requirements for sheet alignment and the visual translations of color sample positions into ink fountain zone control positions. The method may also provide the advantage of reducing the number of distance measurements that must be taken that relate to a specific printing press that would otherwise be required with conventional systems. These advantages may save resources such as time and materials, and may improve accuracy of products printed on the production run. Such an advantage may also reduce the dependency of the method on any particular printing press or model of press output device. These advantages may also provide an operator valuable information about which keys may require adjustment and if so, the degree of adjustment necessary, and may permit enhanced precision in the control of the ink film thickness, which subsequently controls the solid ink density that may be measured at each color sample. The foregoing advantages may also allow more precise matching of solid, as well as tonal, densities for press output data to a proof, and may allow more precise calculation of adjustment values which may then be used to print a production job whose appearance more accurately matches a proof output.

Other technical advantages may be readily ascertainable by those skilled in the art from the following figures, description and claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 15:
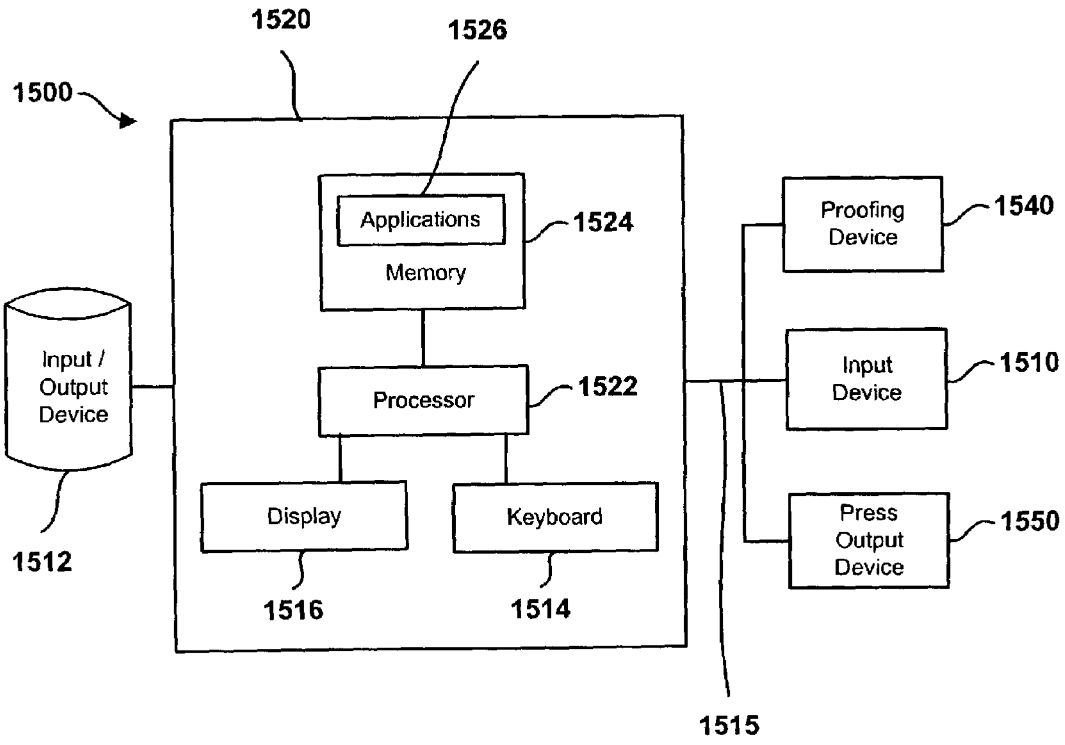
FIG. 15 is a high-level diagram illustrating an exemplary computer that may be used with the present invention.

Color density measurements may be used to permit adjustment of a printing press to a proof of a Printing Adjustment Data Form ("PADF"). The invention contemplates the use of a variety of printing or press output devices as shown in FIG. 15 that are capable of providing printed products using presses in such processes as offset lithography, letter press, gravure, flexography, and screen printing, and with various lithographic processes in development such as waterless lithography, printing with single fluid water-based inks, and plateless digital offset, and in some aspects, with electrophotographic, thermal, and inkjet printing processes. Various aspects of the invention may be used with some or all of these press output devices.

Color densities of any measurement sample are usually provided using four measurement channels: C, M, Y, and V.

C, M, Y, and V represent the following:

C=description of the red wavelength region of the color spectrum which is complemented by the Cyan ink color;

M=description of the green wavelength region of the color spectrum which is complemented by the Magenta ink color;

Y=description of the blue wavelength region of the color spectrum which is complemented by the Yellow ink color;

V=description of the color translated to an achromatic (i.e., gray) value which is primarily used to describe the Black ink color.

Solid density refers to a set of CMYV density measurements taken from a solid, or non-screened, area of an image, using a spectrophotometer, densitometer, scanner, or other color density measurement device. Among C, M, and Y, major density refers to the density measurement of a color sample that is the highest value from among C, M, and Y, and include 'pure' colors C, M, and Y. For the V channel, the major density refers to the density measurement taken solely from the V channel.

The abbreviations C, M, Y, and K may be used to identify the four traditional process colors used in printing for things such as inks, plates, films, and file channels. These four colors are Cyan, Magenta, Yellow, and Black, respectively and measurements for C, M, Y and K are taken from the C, M, Y and V measurements as discussed above. While the term "ink" is used in this description, the invention contemplates using other methods for delivering colorants in the process of printing such as, but not limited to, toners and dyes.

Figure 1:
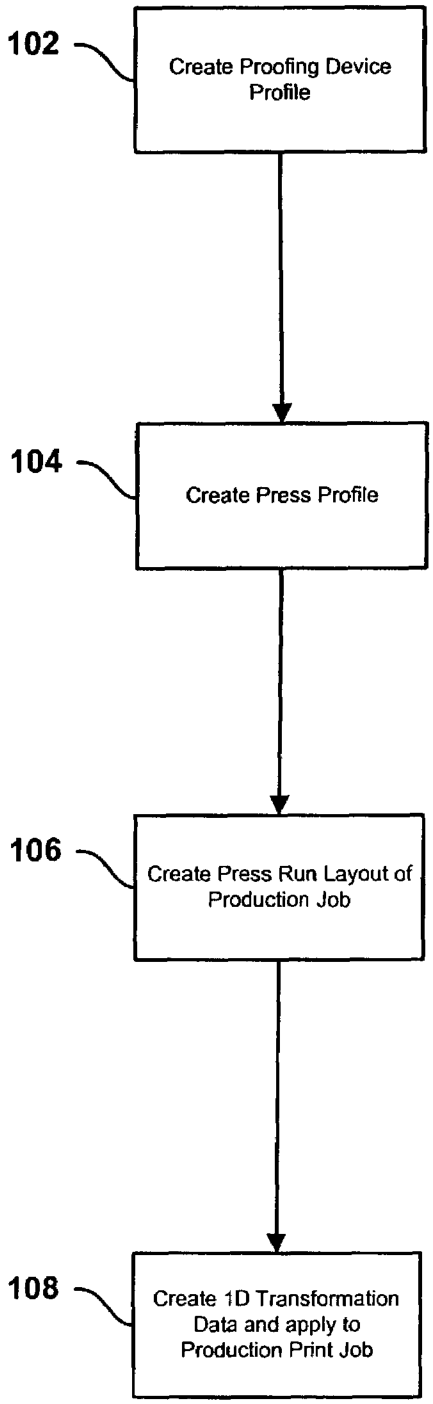
FIG. 1 is an example of a method for providing printing adjustments in accordance with the present invention.

Referring now to FIG. 1, there is shown an example of a flow diagram for a printing adjustment method in accordance with the teachings of the present invention. The method provides generally for bringing solid densities measured from press profile data into concurrence with solid densities measured from proofing device profile data, and then performing calculations to provide adjustment values to be used in a print production job. These calculations include calculating tonal, or screened, densities for the press profile data that may be subsequently compared to tonal densities produced by a proofing device. This comparison facilitates precise calculation of one-dimensional transformation data that may be used for each of the four colors C, M, Y, and K to provide tonal adjustments in response to the adjustments in solid densities. These adjustments in solid densities may be made by, for example, adjusting ink-film thickness. The method also provides for various adjustments to be made during press make-ready procedures, press check procedures, and from time to time as desired during a production run. These adjustments provide objective data that may allow higher quality control over the appearance and fidelity with which a production print job is produced using originally-intended density values to be maintained.

It may be illustrative to describe nine types of solid densities that are referred to while discussing particular embodiments of the present invention. All of these aimpoints may be adjusted to accommodate changes, modifications or enhancements in technology:

1. Commercial Offset Lithography industry's general practice Targeted Solid Major Density Aimpoints as published by GRACoL 4.0 2000, Copyright ©2000, Graphic Communications Association, as per Table I.

TABLE I

| Paper/Substrate | Targeted Solid Major Density Aimpoints* C | M | Y | K |
|---|---|---|---|---|
| Grades 1 and 2 premium gloss/dull coated | 1.40 | 1.50 | 1.05 | 1.70 |
| Grades 1 and 2 premium matte coated | 1.30 | 1.40 | 1.00 | 1.60 |
| Premium text and cover (smooth) | 1.15 | 1.15 | .90 | 1.30 |
| Grades 3 and 5 coated** | 1.30 | 1.40 | 1.00 | 1.60 |
| Supercal SCA | 1.25 | 1.35 | 1.00 | 1.50 |
| Supercal SCB/SCC | 1.10 | 1.15 | .95 | 1.40 |
| Uncoated | 1.00 | 1.12 | .95 | 1.25 |
| Newsprint | .90 | .90 | .85 | 1.05 |
| Newsprint (heatset) | 1.08 | 1.15 | .95 | 1.20 |

*Values are Status-T density, absolute (paper included)

**Same as SWOP ® printing production guidelines

The following densities are expressed as "-Paper", or "-P", which represents a subtracted optical density value of a paper/base substrate from a density value of a color sample.

2. Proofing Device Profile's Solid Major Densities-P refer to solid major densities of generally accepted proofing systems currently available that fall close in proximity to those "Grades 3 and 5 coated" Aimpoints referred to above, or C=1.30, M=1.40, Y=1.00, and K=1.60. Selected values are measured from data in a proof as "Proof Group #2 data" as defined below and are included in a Proofing Device Profile as defined below.

3. PADF Low-Level Solid Major Density-P Aimpoints refer to a first set of targeted densities, which may be considered "lower-than-ideal" for a production job. In a particular embodiment, the PADF low-level Solid Major Density-P Aimpoints are 1.0, 1.1, 0.65, and 1.35 for C, M, Y, and K, respectively.

4. PADF Mid-Level Solid Major Density-P Aimpoints refer to a second set of targeted densities, which may be considered "ideal" for a production job. In a particular embodiment, the PADF mid-level Solid Major Density-P Aimpoints are 1.25, 1.35, 0.90, and 1.60 for C, M, Y, and K, respectively.

5. PADF High-Level Solid Major Density-P Aimpoints refer to a third set of targeted densities which may be considered "higher-than-ideal" for a production job. In a particular embodiment, the PADF high-level Solid Major Density-P Aimpoints are 1.50, 1.60, 1.15, and 1.85 for C, M, Y, and K, respectively.

6. Press Profile's Solid Major Density-P Aimpoints refer to another set of targeted densities. In a particular embodiment, they reflect an approximate average of the industry's current practices based on the utilization of the following substrates; Grades 1 and 2 premium gloss/dull coated, Grades 1 and 2 premium matte coated, Grades 3 and 5 coated, and Supercal SCA, to provide the following values: C=1.25, M=1.35, Y=0.90, and K=1.60. In order to accommodate lower solid density aimpoints corresponding to other substrates, other lower solid density aimpoints may be adopted, which may then be used in accordance with teachings of the invention. However, currently, proofing systems are not generally available to accommodate these lower density aimpoints.

7. Press Profile's Actual Solid Major Densities-P refer to selected density measurements of the solid, or non-screened, areas (i.e., 100% control set points) from a Press Profile. In a particular embodiment, they may be an average or other statistical representation of other measured values, and may be C=1.25+−0.07; M=1.35+−0.07; Y=0.90+−0.07; and K=1.60+−0.07. The benefits of providing variable solid densities across a PADF include the ability to record actual densities that closely approximate the targeted densities. These values are measured from data in a print sheet as "Press Group #2 data" as defined below and are included in a Press Profile as defined below.

8. Press Profile's Adjusted Solid Major Densities-P refer to values for solid densities that may be used to impose adjustment on the actual tonal, or screened, major densities of a Press Profile. In this description, values that may be used are C=1.25+−0.15; M=1.35+−0.15; Y−0.90+−0.15; K=1.60+−0.15. These values represent the adjustment of a Press Profile's Actual Solid Major Densities-P to concur with a Proofing Device Profile's Solid Major Densities-P. In a particular embodiment, tonal adjustments may be made by multiplying an extent of solid density adjustment multiplied by a slope of a linear regression equation determined from Press Group #1 that is obtained from a Press Profile.

9. Make-Ready Solid Major Density-P Aimpoints refer to values adopted from solid major densities of generally accepted proofing systems currently available that fall close in proximity to Aimpoints referred to in item 1. Selected values may be measured from data in an improved press make-ready procedure as defined below and may provide guidance as to whether, and to what extent, ink fountain zone controls may be adjusted. These aimpoints may also be used to monitor values during production or press runs. For example, during make-ready procedures these aimpoints may be used to adjust solid major densities to a Proofing Device Profile. Then, during press check and at various times throughout a production run, measurements may be taken and compared with these aimpoints, to check for fluctuations and provide objective values to aid in decision-making.

In reference to screened areas, traditional industry guidelines unfortunately refer solely to apparent dot size or dot gain, which are values that are relative to a solid density measurement, rather than referring to any tonal densities. The invention provides the advantage of measuring and utilizing, in addition to the foregoing solid density values, a Press Profile's Actual Tonal Major Densities-P, which may be used to provide a Press Profile's Adjusted Tonal Major Densities-P. These values may promote more precise matching of all of the densities for a print sheet to a proof.

The method begins at step 102, where a Proofing Device Profile may be created that represents originally-intended color density values. At step 104, a Press Profile may be created for the printing press, using intentional variations in density. Examples of methods for creating a Proofing Device Profile and a Press Profile are discussed in further detail in conjunction with FIGS. 3 and 4, respectively. From step 104, the method proceeds to step 106, where a press run layout is prepared. In step 106, a Press Color Bar may be added to the press run layout. The Press Color Bar includes a plurality of color samples, some of which may be used to provide measurements and adjustments, and others which may be used indirectly as visual aids. The Press Color Bar also may contain additional identifying and position marking text, some of which may be used in a Press Make-Ready phase of production. One example of a Press Color Bar that may be used in accordance with the invention is discussed in further detail in conjunction with FIGS. 6A and 6B.

Then, at step 108, one-dimensional ("1D") Transformation data is created in response to a comparison of color density deviations or differences between the Proofing Device Profile and the Press Profile. The 1D Transformation Data may then be applied to data to perform the production print job, thus providing densities within press output data that more closely correspond to those within a proof, or that provide an appearance that more accurately corresponds to that of the proof. 1D Transformation Data may be stored and/or used to adjust data in a computer file that is used to create CTP plates. Although this description refers to CTP plates or CTP technology for convenience, the invention also contemplates the use of methods other than CTP plates that may be used to print a production job such as direct imaging (e.g., direct computer-to-cylinder master imaging), the use of interim films, and others as they become available.

Once the 1D Transformation Data has been determined, it may then be applied to a production run image of the printing press that will more closely approximate a proof of the production run image than if the ID Transformation Data had not been applied. For example, each of the screened or tonal percent dot values (e.g., 90%, 75%, 50%, 25%, 10%, 5%, and any other percentage dot value between 100% and 0.0%) for each of CMYK may be adjusted using the 1D Transformation Data. This adjustment provides adjusted percent dot values so that color density values within the press output data provide an appearance that approximately corresponds to the appearance of color density values of the proof. In other words, a production image printed with these adjusted percent dot values will have color density values that more closely approximate the originally-intended color densities of a proof of the production image. This process provides more accurate printing than conventional systems, is substantially substrate-influence-independent, and may use several proofing devices. Proofing devices as illustrated in FIG. 15 include, but are not limited to a variety of imaging devices such as ink-jet or thermal printers, and half-tone printing devices such as Waterproof® by DuPoint, Matchprint™ by Imation, ColorArt by Fuji, or Approval by Kodak. These devices may use a variety of methods to produce a proof on a substrate, including interim film and direct digital output. One example of 1D Transformation Data that may be applied to a production print job is illustrated below:

TABLE II

One-Dimensional Transformation Data Examples

| Control Set | Percent Dot Adjustments | | | |
|---|---|---|---|---|
| Point | Cyan | Magenta | Yellow | Black |
| 90% | −6.59 | −5.41 | +3.24 | −.43 |
| 75% | −6.73 | −3.16 | +3.70 | −.47 |
| 50% | −3.54 | +1.32 | +1.83 | −.03 |
| 25% | +.15 | +1.50 | +1.15 | +1.37 |
| 10% | −.33 | −.56 | +1.50 | +.73 |
| 5% | −.25 | −.45 | +1.16 | +.15 |

For example, a Cyan 90% control set point may be adjusted downward −6.59 percent to obtain an adjusted value of 83.41%, resulting in a lower (adjusted) color density of the Cyan 90% control set point. These adjustments may be made by, for example, providing the adjustment or the adjusted value to one of a number of well-known computer programs used to create CTP plates or film negatives or positives. These adjustments may be applied to data to be used to print on the printing press adjusted density values that approximately correspond to intended density values. For example, these adjustments may be saved into an adjustments file, applied to an existing data file, applied on-the-fly as the production print job is performed, or a combination of the above. FIGS. 9–14 illustrate methods that may be used in the process of providing ID Transformation Data.

Figure 2:
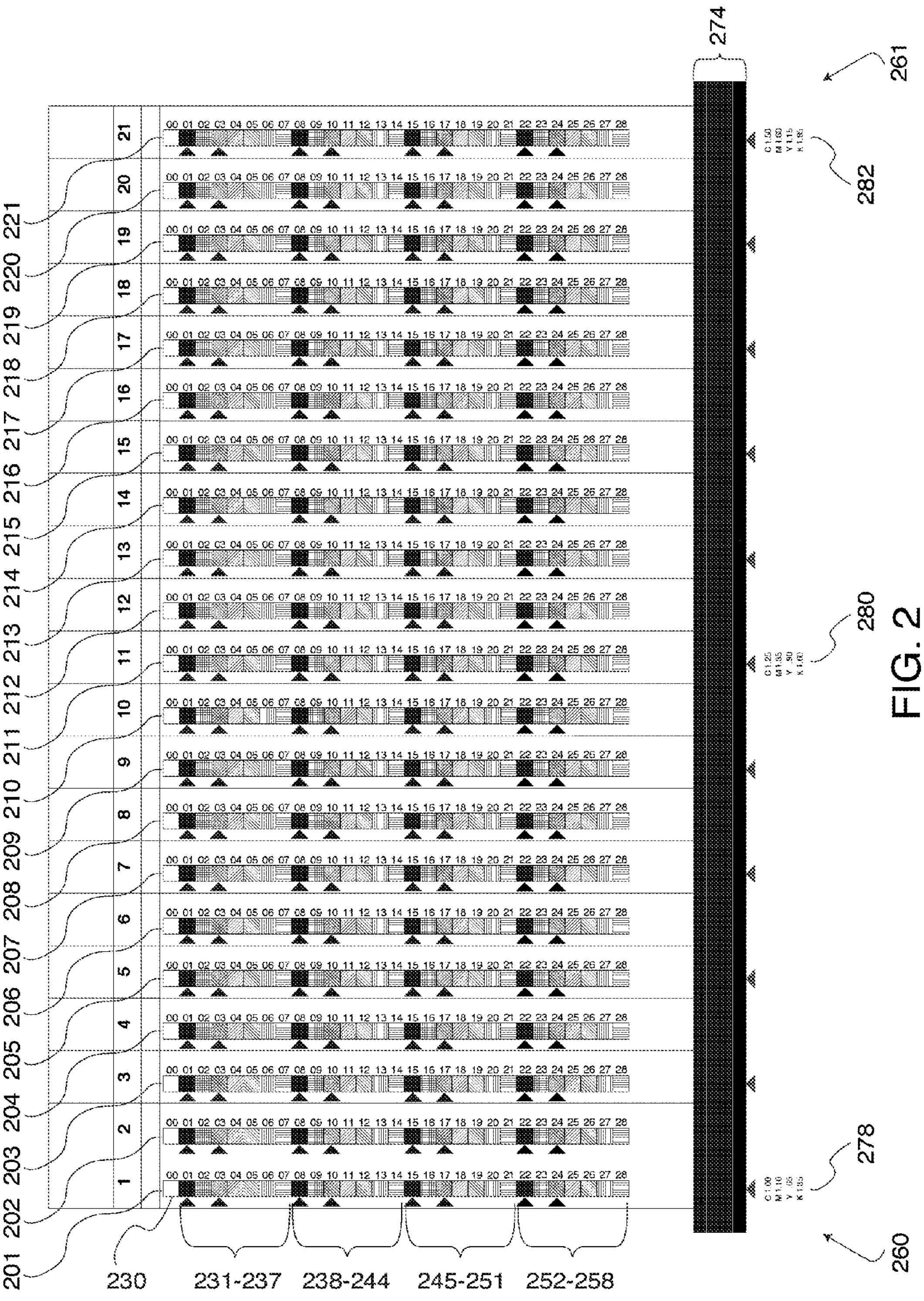
FIG. 2 is an exemplary Printing Adjustment Data Form ("PADF") in accordance with teachings of the present invention.

FIG. 2 illustrates an example of a PADF that may be used in accordance with teachings of the present invention. The PADF may be used to provide a profile of information that may be used to more accurately define the output of a printing press and/or a proofing device. For example, color density measurement data of a PADF that is printed by a printing press (the "Press Profile") may be compared to color density measurements taken from a PADF that is output by a proofing device (the "Proofing Device Profile"). Adjustments may then be made in response to the comparison so that the printing press' output will more closely match the output of the proofing device.

The PADF includes a plurality of color control areas, each of which includes a region of solid color density (i.e., 100 percent dot or solid region) and one or more screened, or tonal, regions (e.g., 5, 10, 25, 50, 75, 90 percent dot) for each of CMYK. In a particular embodiment, a PADF includes a plurality of color control areas that are each in the form of a control strip 201–221. Each of control strips 201–221 includes 29 control set points 230–258, which includes a 0% dot control set point (i.e., no ink applied to the substrate) 230, and control set points 231, 238, 245, and 252 that represent solid (i.e., 100% dot) C, M, Y, and K. In addition, each control strip 201–221 also includes 5, 10, 25, 50, 75,and 90 percent dot control set points for each of CMYK. Of course, other predetermined percent dot values may be established as needed. In a particular embodiment, each of the printed control set points 230–258 may than measure at least 3 mm across so that density values may be accurately measured. These shapes and sizes of these control set points may vary according to the application, and their size may be reduced as technology improves. As one example, they may be regularly-shaped, such as a square or circle, or irregularly shaped.

Each of 29-sample control strips 201–221 includes control set points 230–258, which represent the following predetermined percent dot values for CMYK:

TABLE III

| Percent Dot Values | | |
|---|---|---|
| 230 | | 0% |
| 231 | C | 100% |
| 232 | C | 90% |
| 233 | C | 75% |
| 234 | C | 50% |
| 235 | C | 25% |
| 236 | C | 10% |
| 237 | C | 5% |
| 238 | M | 100% |
| 239 | M | 90% |
| 240 | M | 75% |
| 241 | M | 50% |

TABLE III-continued

| Percent Dot Values | | |
|---|---|---|
| 242 | M | 25% |
| 243 | M | 10% |
| 244 | M | 5% |
| 245 | Y | 100% |
| 246 | Y | 90% |
| 247 | Y | 75% |
| 248 | Y | 50% |
| 249 | Y | 25% |
| 250 | Y | 10% |
| 251 | Y | 5% |
| 252 | K | 100% |
| 253 | K | 90% |
| 254 | K | 75% |
| 255 | K | 50% |
| 256 | K | 25% |
| 257 | K | 10% |
| 258 | K | 5% |

In general, the PADF may be used to quantify the printing characteristics of a g press and peripheral printing conditions' printing characteristics, and may be n offset printing processes on coated papers with a whiteness/brightness level to the most likely anticipated production paper to be utilized. The PADF is run printing press with ink film thickness set to vary from a lower value on a first of the PADF and gradually increasing to a larger value to a second side 261 of the PADF; thus, when the PADF is printed, the color density measurements of the 29-sample control strips toward first side 260 of the form will tend to be less than those on second side 261. In other words, color density measurements are intentionally increased to a predetermined amount from first side 260 to second side 261. In a particular embodiment, these measurements may vary as a function of increasing ink film thickness and/or tonal reproduction characteristics of the printing device (including printing press and peripheral printing conditions' printing characteristics). In a particular embodiment, the color density measurements increase from first side 260 to second side 261 by using substantially linear transitions. For example, a PADF with a distance between first side 260 to second side 261 of 22 inches may include a total density variation across all four colors C, M, Y and K of 0.50. These density values include the PADF Low-Level, Mid-Level, and High-Level solid Major Denisty Aimpoints 278, 280, and 282.

The PADF may also include a control perimeter, which in a particular embodiment includes a four-color CMYK color strip 274, and/or text that represents PADF Low-Level, Mid-Level, and High-Level Solid Major Density Aimpoints 278, 280, and 282, respectively. Four-color CMYK color strip 274 may be used to determine if the printing press is meeting the PADF Low-Level Solid Major Density Aimpoints 278, PADF Mid-Level Solid Major Density Aimpoints 280, and PADF High-Level Solid Major Density Aimpoints 282, as described in more detail in FIG. 5. The PADF may be provided in one of many electronic data formats and may be printed using a proofing device and/or a printing press. One such format may be a digital EPS computer graphics file format that may be used to create four CTP CMYK plates representing the PADF.

Although control set points 230–258 are set at 0, 5, 10, 25, 50, 75, 90, and 100 percent dot in a preferred embodiment, alternative control set point percent dot values may be established as needed. Current 8-bit pixel depth digital imaging provides for a total of 256 percent dot gradations from 100% dot (i.e., solid area) to 0% dot (i.e., substrate);

therefore, using 8-bit pixel depth digital imaging permits 0.4% between successive percent dot gradations even when less than the 256 potential gradations are used as control set points. In a particular embodiment, interpolation may be used to calculate an adjustment to be applied to each of the 256 percent dot gradations. These samples may be referenced visually and by instrument measurement, which facilitates employment of quality control, statistical process control, and ISO 9000 certification required procedures. Also in a particular embodiment, the PADF may include a 29-sample color strip 274 rather than or in addition to 29-sample control strips 201–221. Such an embodiment also provides varying density measurements between first side 260 and second side 261 for all solid and tonal control set points that are described above.

Figure 3:
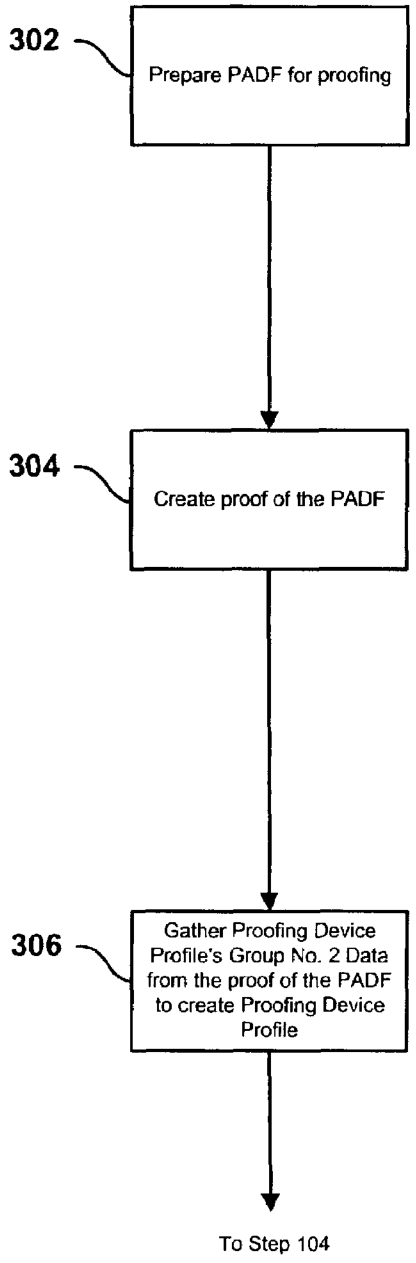
FIG. 3 is an example of a method for creating a Proofing Device Profile in accordance with teachings of the present invention.

FIG. 3 is an example of a method for creating a Proofing Device Profile. A Proofing Device Profile may be created by first preparing a PADF for proofing in step 302. This step may include, for example, creation of CMYK film negatives or positives from a PADF graphics computer file. In step 304, the PADF proof may be output by a proofing device at predetermined calibrations, which in a preferred embodiment include the proofing system manufacturer's specifications. This proof may be created from the negatives or positives or created directly as digital proof data, and is not printed using variable ink or colorant film thickness. In step 306, the color density of each control set point 230–258 for some or all of control strips 201–221 of the PADF output by the proofing device is measured as Proof Group No. 2 Data. For example, in a particular embodiment, the color densities of each control set point 230–258 for a selected number (e.g., eight) of control strips 201–222 may be measured. Proof Group No. 2 Data may then be provided as a statistical representation, such as an average, of these selected measurements. This measurement data provides the Proofing Device Profile.

Figure 4:
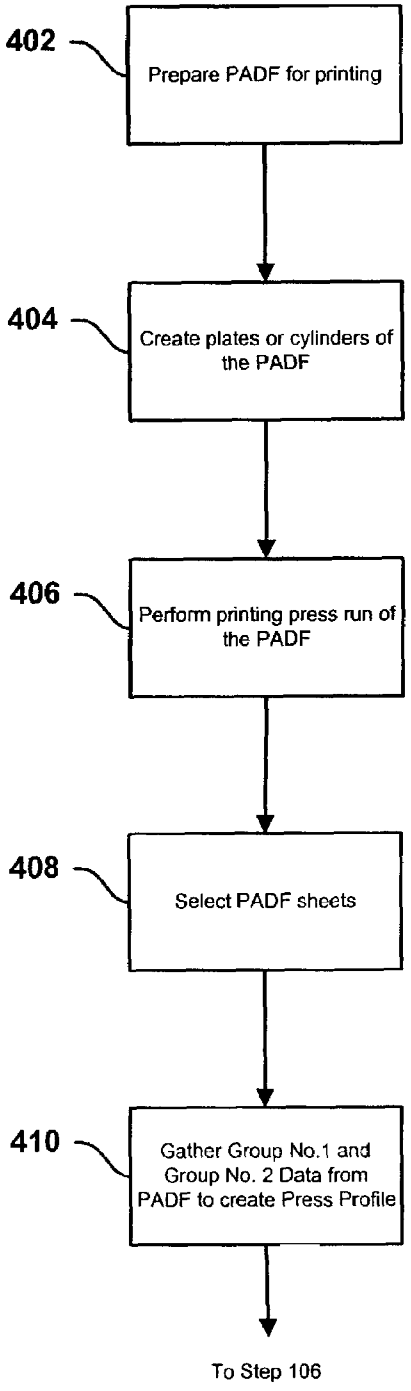
FIG. 4 is an example of a method for creation of a Press Profile in accordance with teachings of the present invention.

FIG. 4 is an example of a method for creating a Press Profile. Method 400 begins when a PADF is prepared for printing at step 402. The overall dimensions of the PADF may be modified and the positions of one or more of control strips 201–221 may be reset as necessary to correspond with the maximum print area and the locations of and spacing between the ink fountain zone controls of the printing press to be adjusted. For example, one or more of control strips 201–221 in the PADF may be laterally repositioned so that the positions of the one or more of the strips may be matched with the center point position of a press' ink fountain zone control. Such repositioning may be advantageous because, among other things, it may permit enhanced precision in the control of the ink film thickness that subsequently controls the solid ink density for each control strip. Such precision and control allows more accurate comparison of a Proofing Device Profile and a Press Profile, and thus more accurate matching of the appearance of a press output to that of a proof.

After preparation of the PADF at step 402, the method proceeds to step 404, where computer-to-plate ("CTP") plates for the PADF are created. For example, in a particular embodiment, creation of the CTP plates of the PADF includes exposure of the CTP plates images by laser radiant energy modulated by the contents of the computer file containing data representing the PADF. In step 406, a printing press run of the PADF is performed using the CTP plates created at step 404. One example of a method of performing a printing press run is discussed in further detail in conjunction with FIG. 5.

In step 408, PADF sheets printed by the printing press are selected for use in gathering data in later steps of press profile creation. One method for selecting PADF sheets includes selecting a plurality of sequential PADF sheet samples from approximately the center of a stack of sheets printed as discussed in conjunction with step 514. This plurality of selected sequential sheets may vary according to the application and may be, for example, twenty-five (25). Then, a subset (for example, nine (9)) of these sequential selected sheets may be culled as designated sheet samples. The remaining sheets (in this case, sixteen (16)) may then be saved in case one of the culled sheets is damaged, and the designated sheet samples may then be identified. For example, these sheet samples may be labeled as "PADF sheet sample 1 of 9"–"PADF sheet sample 9 of 9" and may be later used in composition of the Press Profile.

In step 410, Press Group No. 1 and Press Group No. 2 data may be gathered from the ten PADF sheets printed on the printing press. Press Group No. 1 data and Press Group No. 2 data may be gathered in the same step or different steps. One example of a method for gathering of Press Group No. 1 data includes measuring and recording actual color densities of control set points 230–258 (0, 5, 10, 25, 50, 75, 90, 100 percent dot values) for all control strips 201–221 of the PADF sheet designated "PADF sheet sample 1 of 9" to create Press Group No. 1 data. Then, the color densities of selected control set points 230–258 for the remaining designated PADF sheet samples may be measured and recorded to obtain Press Group No. 2 data. One example of a method for gathering Press Group No. 2 data is discussed in further detail in conjunction with FIG. 8.

Press Group No. 1 data and Press Group No. 2 data may also be gathered using a variety of other methods. For example, all of the color densities of control set points 230–258 for all of control strips 201–221 for any number of selected sequential sheets may be measured. Press Group No. 1 Data may then be provided by averaging the color densities measured for each control strip 201–221 from all of the sequential sheets, resulting in 21 sets of control set points 230–258. Similarly, the color densities of selected control set points 230–258 from all of these sequential sheets may be measured and recorded as Group No. 2 Data as discussed in further detail in conjunction with FIG. 8.

Figure 5:
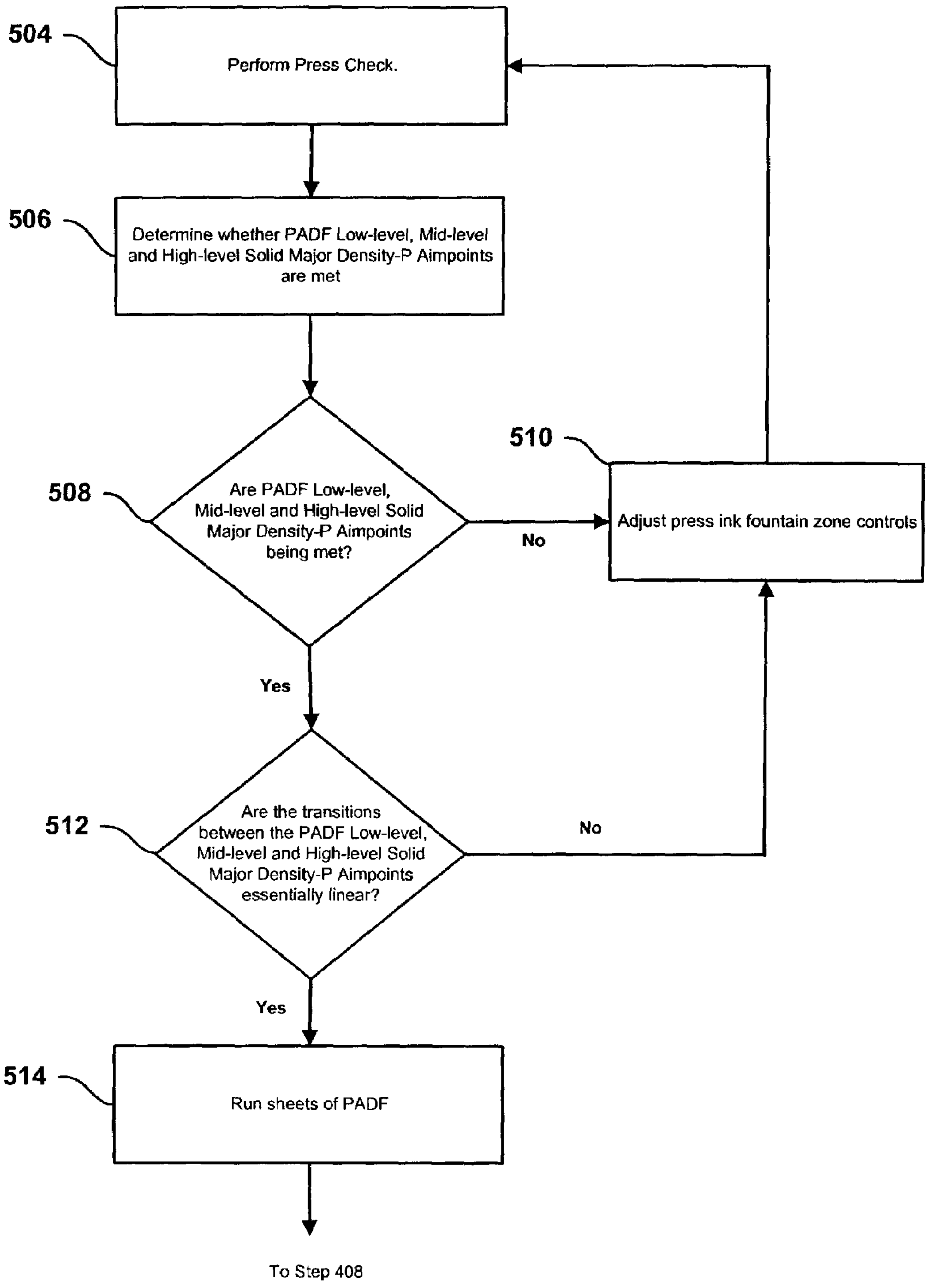
FIG. 5 is an example of a method for performing a printing press run of a PADF in accordance with teachings of the present invention.

FIG. 5 is an example of a method for performing a printing press run of a PADF that represents in more detail step 406 of FIG. 4. In step 504, a press check may be performed. For example, enough sheets may be printed to ensure, among other things, irregularities are minimized and proper ink and water balances are maintained. In step 506, PADF sheet samples from the press may be measured at random to determine whether selected original color density values, which in a particular embodiment include PADF Low-Level Solid Major Density-P Aimpoints 278, PADF Mid-Level Solid Major Density-P Aimpoints 280, and PADF High-Level Solid Major Density-P Aimpoints 282, are being met for each of CMYK. These measurements may be, for example, measurements of color density performed using a densitometer, spectrophotometer, scanner, or other device for measuring color density.

A determination then may be made in step 508 as to whether the PADF Low-Level Solid Major Density Aimpoints, PADF Mid-Level Solid Major Density Aimpoints, and PADF High-Level Solid Major Density Aimpoints are being met (i.e., the printing press is printing the PADF at these Aimpoints) for Cyan, Magenta, Yellow, and Black. If it is determined that any of these Aimpoints is not being met by the press, the press' ink fountain zone controls may be adjusted as appropriate at step 510. From step 510, the method returns to step 504.

If the PADF Low-Level, Mid-Level, and High-Level Solid Major Density Aimpoints for each of Cyan, Magenta, Yellow, and Black are all being met, the method proceeds to step 512. In step 512, a determination is made whether the transitions between the PADF low-level and mid-level PADF Solid Major Density Aimpoints and the transition between the mid-level and the high-level PADF Solid Major Density Aimpoints for each of CMYK are essentially linear. The determination may be made, for example, manually by a user who reviews the solid major density measurements; however, this determination could also be made by a computer.

If, at step 512, not all of the transitions are essentially linear, the method proceeds to step 510, in which the press' ink fountain control keys may be adjusted as appropriate. From step 510, the method returns to step 504. On the other hand, if these transitions are all essentially linear, the method proceeds to step 514, where a number of sheets of the PADF are run on the printing press. The number of sheets may vary according to the application and may be approximately 200 sheets.

Other methods of performing a printing press run of the PADF and collecting data therefrom may also be used. For example, the PADF run may be separated into two or more sessions. For example, in a first session, the printing press could be set to apply a maximum ink film thickness across the PADF, and then the press' ink supply could be shut off completely and the press allowed to continue to operate, successively starving the PADF of ink as the press' ink train is depleted. When the ink film thickness approaches a designated low-level color density aimpoint, the printing run of the PADF would be complete. Thereafter, PADF sheet samples could be measured to find those samples containing different ink film thicknesses in incremental progression between high and low-level PADF Aimpoints. Those samples meeting predetermined criteria for color density could be culled, and color density measurements of the culled sheets' control set points taken. In a second session, the PADF could be printed at an approximately mid-level ink film thickness approximately evenly across the PADF and a predetermined number of PADFs culled in sequential order from this printing press session. Color density measurements could then be taken of predetermined control set points of the culled sheets.

Figure 6A:
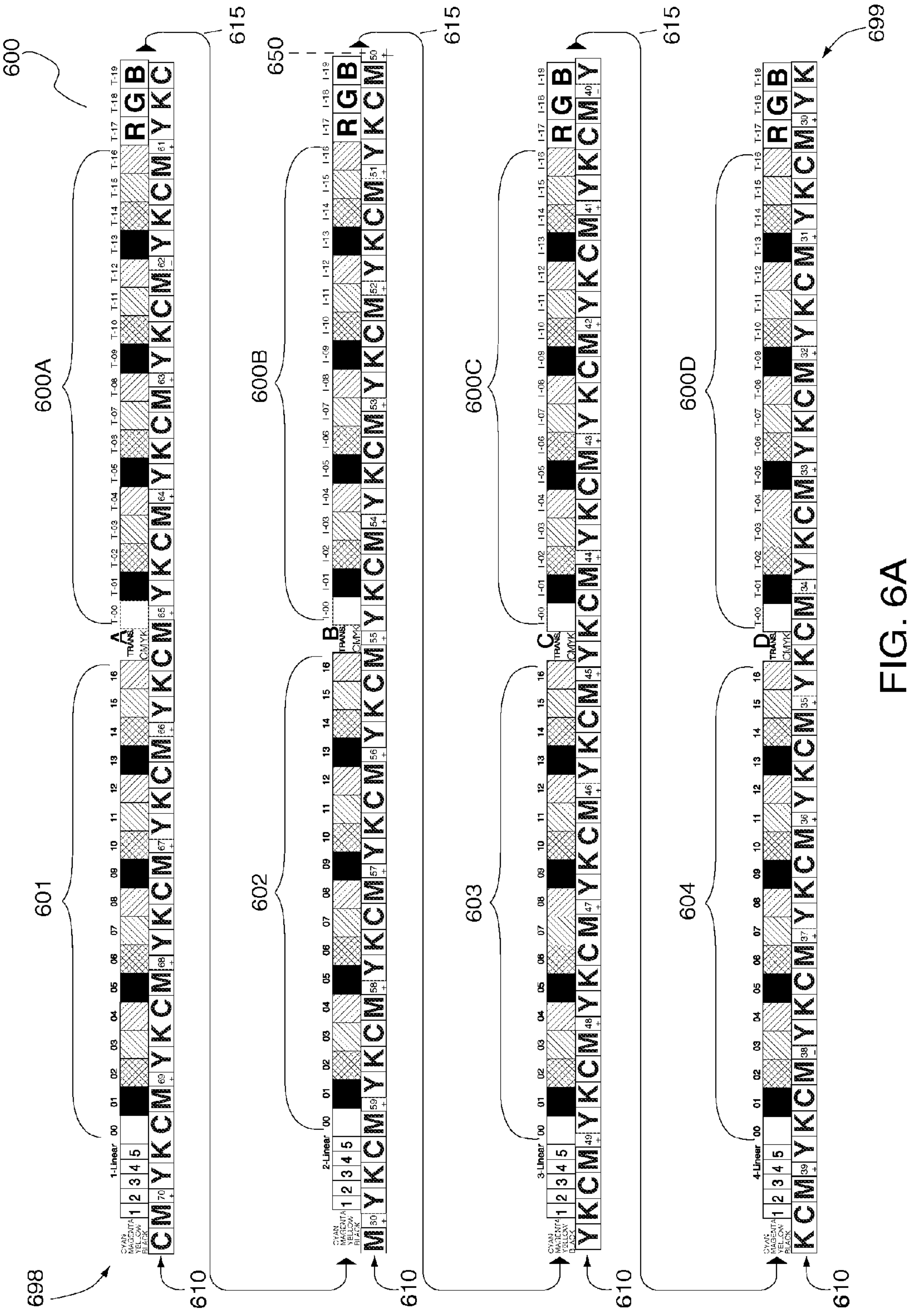
FIG. 6A is an example of a Press Color Bar that may be used in accordance with teachings of the present invention.

FIG. 6A is an example of a Press Color Bar that may be used in accordance with teachings of the present invention. Press Color Bar 600 may be included on every press run layout for every print production press run. Such an implementation includes the advantage of allowing improved press make-ready procedures and improved press check procedures, each of which are efficient, fast, and accurate, by providing tools for press operators that would otherwise not be available with the use of conventional systems.

Press Color Bar 600 includes a plurality of color samples that may be divided into three distinct groups. In this embodiment, the three distinct groups of samples may be spaced incrementally across the color bar in two rows across the width of a press, which is typically approximately 40". FIG. 6A illustrates a continuation of these two rows by a series of arrows 615. For example, in an embodiment adapted for use with a 40" press, these groups include four Linear Segments 601–604, four Transformed Segments 600A–600D, and forty-one Make-Ready Segments 610. In this example, a centerpoint 650 denotes the centerpoint of Press Color Bar 600, which corresponds to Make-Ready Segment Identifier or center 50. Press Color Bar 600 may be provided in one of many electronic data formats such as a digital EPS computer graphics file format. As one example, this file format may include two or more linked computer files, where each is composed of four, CMYK channels. Although not illustrated in FIG. 6, Press Color Bar 600 may also include additional segments. For example, an additional row could be added where desired to provide one to four additional colors such as a 5th, 6th, 7th, and/or 8th for use in five- to eight-color printing. These additional colors may be used in applications where it may be advantageous to print large flat areas such as backgrounds by using a single ink, rather than using a color combination of C, M, Y, and/or K.

Linear Segments 601–604 may be contained in the first file, and may be positioned as a first row that contains 17 one-dimensional (1D) color samples, or 'pure' C, M, Y, and K colorants which do not overlap one another, with solid and screened areas that may be used in accordance with the present invention. For example, each of Linear Segments 601–604 includes control set points 01–16, which correspond to solid and screened color sample values (e.g., 100, 75, 50 and 25 percent dot values) for each of C, M, Y, and K, and a sample 00 which has no ink. Transformed Segments 600A–600D may be contained in the second file, and may be positioned as a portion of the first row that contains 17 additional 1D color samples with solid and screened areas that may be used in accordance with the present invention. Each of Transformed Segments 600A–600D includes control set points T01–T16, which correspond to solid and screened color sample values (e.g., 100, 75, 50 and 25 percent dot values for each of C, M, Y, and K) and a sample T00 which has no ink.

Make-Ready Segments 610 may be identified and marked for position with identifiers (e.g., 70 through 30) sequentially from a first side 698 to a second side 699, and may be positioned as a second of the two rows. Make-Ready Segments 610 include four 1D color samples with solid areas of C, M, Y, and K that may be used in accordance with the invention. One example of a method that may use one or more Make-Ready Segments 610 is discussed in further detail in conjunction with FIG. 6B. Linear Segments 601–604 and Make-Ready Segments 610 may not receive any transformation at the plate making phase of production; thus, the initial file values may be retained as the plates are made. On the other hand, Transformed Segments 600A–600D may receive the same ID Transformations that are performed on the job during the press production run. Alternatively, where transformation is applied to values measured in Transformed Segments 600A–600D, these transformations may be stored in a separate file and used as the plates are made.

During the press check phase of production, Press Color Bar 600 may also be used to provide objective data that may be used to determine what adjustments should be made when the appearances of sheets produced by the press (press sheets) are unacceptable. A combination of subjective data and objective data provides an advantage over the subjective data alone that must be interpreted by a pressman into adjustment combinations required for CMYK tonal reproduction. Subjective data is usually expressed in non-technical terms where, for example, a print buyer describes a print relative to a proof appearance using terms such as, "The browns are too muddy", or "The greens have turned olive".

For example, density values of color samples within Transformed Segments 600A–600D may be measured to provide collected transformed data, which may then be compared to a Proofing Device Profile corresponding to the print job to create compared transformed data. Compared transformed data describes density variations between the press sheets and tonal reproduction densities in data output by a proofing device (a proof) and may be used to make decisions as to whether, and to what extent, adjustments are required on any or all combinations of CMYK tonal reproductions. One method for making these decisions is discussed in conjunction with FIG. 13.

In addition, density values of color samples within Linear Segments 601–604 may be measured to create collected linear data, which may then be compared to Group No. 2 Data in a Press Profile corresponding to the press used for this particular production run to create compared linear data. Compared linear data describes density variations between the press sheets and tonal reproduction densities in the Press Profile, and may be used to make decisions on what adjustments are required on any or all combinations of CMYK tonal reproductions, and the degree of such adjustments. One method for making these decisions is discussed in conjunction with FIG. 14.

Such information regarding these density variations may then be interpreted by a skilled pressman to bring the press sheet into appearance acceptability. Such an advantage may reduce the number of experimental iterations that would otherwise be required to perform adjustments in the production run to support the print buyers' opinions as to whether the press sheet appearance is acceptable. Moreover, where visual or subjective assessment does not concur with density variations, such a method may indicate that extraneous problems may be present.

Compared transformed data and compared linear data may then, in a particular embodiment, be used to prepare an Interim Press Profile Adjustment (IPPA). An IPPA may then be used to carry out some or all of the adjustments described above. In a particular embodiment, an IPPA may be a table of density adjustment values that may be used and/or assigned to a specific Press Profile in order to adjust that Press Profile, as described in FIGS. 9 and 10. For example, these adjustments may be used to account for, and reduce, the impact of drift in the printing characteristics of the press that may have occurred since the Press Profile was created, and/or for other day-to-day fluctuations in printing characteristics. These fluctuations include, but are not limited to, variations due to paper/base substrates, inks, plates, fountain solutions, image transferring cylinder blankets, press mechanical settings and ambient moisture/temperature conditions, which may change batch-to-batch or day-to-day. Such an advantage reduces variations due to these fluctuations, which are typically not practical to correct before running each production job.

One example of an IPPA that may be used is illustrated below in Table III.

| Control Set Point | Cyan | Magenta | Yellow | Black |
|---|---|---|---|---|
| 90% | .016 | −.04. | .012 | .02 |
| 75% | .040 | −.10. | .030 | .05 |
| 50% | .03 | −.05 | .030 | .04 |
| 25% | .01 | −.03 | .020 | .01 |
| 10% | .004 | −.012 | .008 | .004 |
| 5% | .002 | −.006 | .004 | .002 |

For example, a Cyan density value of 1.15 of a Press Profile at a 90% control set point may be adjusted upward 0.016 to obtain an adjusted value of 1.166 density, resulting in, among other things, a higher adjusted density value for the Cyan 90% control set point. These adjustments may be made by, for example, providing the adjustment or the adjusted value to be applied to data from the Press Profile. These adjustments or adjusted values may then be used to create 1D Transformation Data that reflects the IPPA values.

Figure 6B:
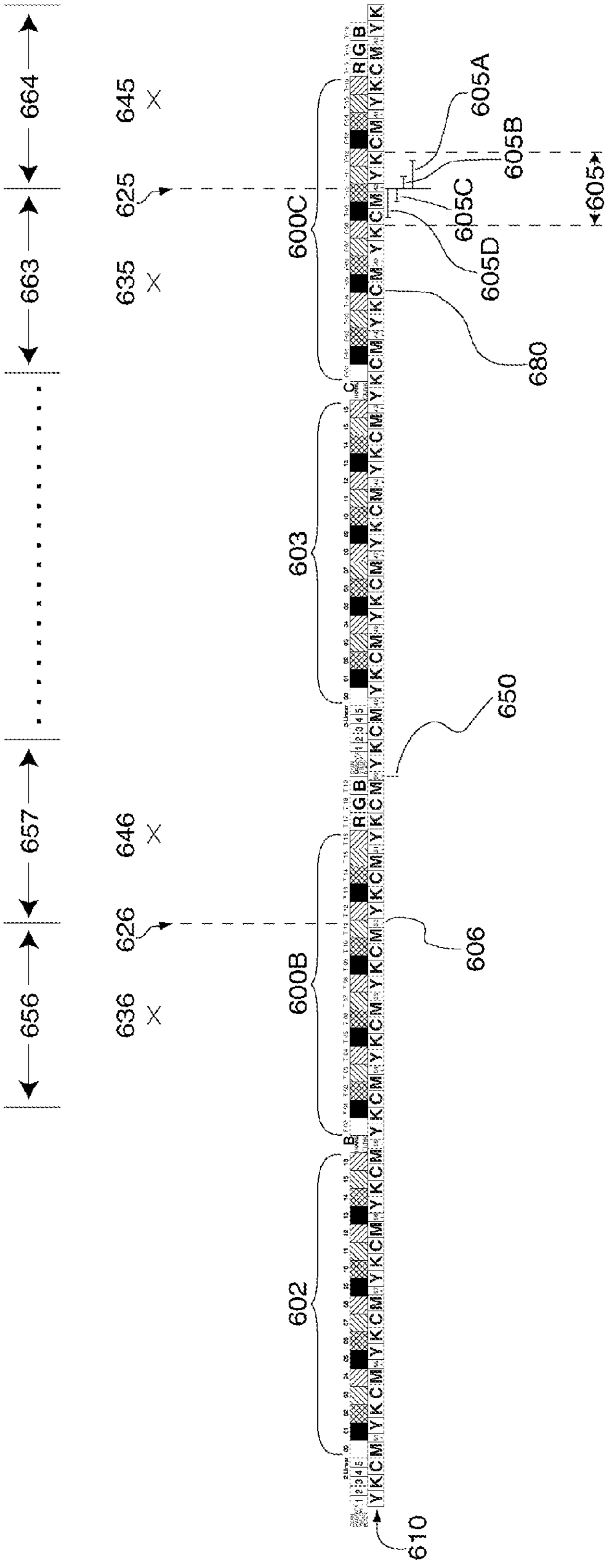
FIG. 6B graphically illustrates aspects of a Press Color Bar that may be used in accordance with teachings of the present invention.

FIG. 6B graphically illustrates a Press Color Bar that may be used in accordance with teachings of the present invention. The use of Make-Ready Segments 610 may provide advantages over traditional systems. Make-Ready Segments 610 are spaced or sized at regular intervals, and may also be used to provide a make-ready procedure that is substantially independent of the press on which the procedure is run. FIG. 6B illustrates the width of Make-Ready Segment 605. As one example, in a particular embodiment, these Make-Ready Segments may be spaced at 25 mm intervals, or have widths of 25 mm. Make-Ready Segments also include offset positive or negative fractions of the width of a segment that represent relative portions of Make-Ready Segments. As one example, these offsets represent a distance from each of Make-Ready Segments' 30–70 identifier or center to the center of the color samples C, M, Y and K. These offsets may be used to identify a coordinate at which a density measurement was made from the center of an ink fountain zone control, and which may be used to later provide adjustments to the ink fountain zone control. For example, Make-Ready Segment 42 (identified in FIG. 6B as the center or identifier of end segment 605) includes color samples C, M, Y, and K respectively at offsets 605D, 605C, 605B, and 605A respectively. Offsets for C, M, Y, and K may have the same fractional value for each of the Make-Ready Segments, and may be represented as a fractional value of the width of the segment. In a particular embodiment, offset 605A may have a fractional value of −0.39, offset 605B may have a fractional value of −0.17, offset 605C may have a fractional value of +0.17, and offset 605D may have a fractional value of +0.39.

During a press make-ready phase of production, some or all of Make-Ready Segments 610 may be correlated with some or all of the press' ink fountain zone controls. Four examples of press' ink fountain zone controls 635, 636, 645, and 646, are illustrated in FIG. 6B near examples of virtual ink fountain zone control numbers (vfcs) 625 and 626. Also as illustrated in FIG. 6B, ink fountain zone control 636 is in zone 656, ink fountain zone control 646 is in zone 657, and ink fountain zone controls 635 and 645 are in zones 663 and 664, respectively. Most printing presses utilize a generally linear array of ink fountain zones whose approximate center is either a center of an ink fountain zone, or a border between two zones. Each fountain zone control usually has an identification or position number at approximately the center of each zone that indicates its position across the printing cylinder. The invention may also be used where fountain zone controls are not centered within a zone. An ink fountain zone control may be a spigot, a key, a switch, or other mechanism that may be used to distribute or mete out a desired amount of ink or colorant on a region during printing.

Usually a first sheet off the printing press may be aligned on the press' console by placing one or more centerpoints 650 as illustrated in FIG. 6B at the center of the array of ink fountain zone controls (not explicitly shown), which is usually clearly marked on the console's ink fountain control scale. In this embodiment, FIG. 6B illustrates two Make-Ready segments 52 and 42 that are selected as respective end segments 605 and 606, and that encompass live copy matter where color directing and adjusting is involved, or the "encompassed segments". The encompassed segments may vary from application to application, and usually include an area with a distribution of colors that are printed on the press, and may be a subset or the entire width of a paper/base substrate. For each of these end segments 605 and 606, a corresponding virtual ink fountain zone control 625 and 626, respectively, may be assigned. Virtual ink fountain zone controls (vfcs) 625 and 626 may be assigned using a relative estimate of distances between actual ink fountain zone controls 635 and 645, and ink fountain zone controls 636 and 646, respectively. In some applications, these end segments may exactly correspond to a position of an ink fountain zone control on the printing press.

For example, a straight-forward method for interpolating such vfcs may be used. This method may include, for example, a press operator's best estimate of a position of the center of an ink fountain zone of the press as compared to the position of end segments 42 and 52. The press operator may then note which two of the ink fountain zone controls correspond to these end segments. In this example, a location of vfc 10.5 is 50% of the distance between ink fountain zone control 10 and ink fountain zone control 11 of the press. Thus, in this example, the press operator may correlate Make-Ready Segment 42 to a vfc 625 whose number is 10.5 and similarly, Make-Ready Segment 52 may be correlated to a vfc 626 whose number is 18.5. After these two corresponding vfc's are noted for Make-Ready Segments 42 and 52, density variations for each of C, M, Y, and K may be noted. Virtual ink fountain zone controls (vfcs) may be calculated for all of the color samples within the encompassed Make-Ready Segments 42–52 using a variety of methods, one of which is discussed in conjunction with FIG. 7.

Measurements of density values of color samples within Make-Ready Segments 610 such as Cyan sample 680 of Segment 43, may be taken across all or a portion of the width of the encompassed segments in a press run layout. The solid density of each solid C, M, Y, K sample measured on the color bar may then be measured and compared to the Make-Ready Solid Major Density Aimpoints to provide color density variation data. This data may also describe variations across the press run layout that correspond to the press' ink fountain control keys. This data may provide the press operator valuable information about which keys require adjustment and to what degree the adjustment must be made, as discussed in FIG. 7 .

Correlating Make-Ready Segment identifiers to ink fountain zone controls provides a method that may provide an advantage over both traditional as well as recently developed methods by removing the need for taking tedious distance measurements that would be required for these systems. For example, centerpoints 650 may always be positioned in the center of a press run layout on all production jobs at the prepress phase of production, and then alignment may be done of centerpoint 650 of the first sheet off the press to the scale on the press' console representative of the array of ink fountain zone controls, designation of end segments may be noted, and correlation of vfcs to end segments may be noted, all in a time that may be less than 30 seconds. This may offer significant time savings and improved accuracy over recently developed methods.

In addition, aspects of the present invention which may offer advantages over other methods include a method for using interpolation using each Make-Ready Segment identifier and offsets 605A–605D for each of the colors C, M, Y, and K. Interpolation may be used to determine virtual ink fountain controls and density variations that may be used to adjust ink fountain zone controls according to a desired density such as Make-Ready Solid Major Density Aimpoints. Another aspect includes the designation of live copy matter and use of encompassed segments and end segments, which enables ink fountain zone controls to be adjusted by utilizing measurements taken for the encompassed segments, in this case segments 42–52, by a method such as the one discussed in FIG. 7.

These aspects of the present invention may reduce or eliminate the need to include distance measurements of the color samples' relation to an exact reference point such as the center of a printing press, and may also significantly reduce the time and resources involved in providing adjustments to ink fountain zone controls that would otherwise be necessary with traditional methods or systems. Such an advantage may increase the speed with which make-ready procedures may be performed, and reduce the chance for operator error. For example, the present invention provides for designating live copy matter, which conserves resources by reducing the requirements that would otherwise be imposed on the press operator to spend time and effort on monitoring and/or adjusting ink fountain zone controls that may not effect the color fidelity of the production print job.

In addition, the present invention also contemplates in some applications as desired the enlargement or reduction of Make-Ready Segments 610 along the row on an axis between first side 698 and second side 699. Because coordinates are not used to designate the position of the color samples on the color bar or the press sheet and because Make-Ready Segments 610 are regularly sized and the width of each segment does not have to be known, such enlargement or reduction may be performed as desired by, for example, a simple print or other command. This ability to enlarge Make-Ready Segments 610 as desired may provide the advantage of decreasing the quantity of color measurement samples, which may expedite the make-ready procedure. On the other hand, the ability to reduce the size of Make-Ready Segments 610 as desired may provide the advantage of increasing the quantity of color measurement samples to create additional data. This additional data may provide finer control in performing adjustments as needed to meet the requirements of the print production job at hand. Changing the sizes of Make-Ready Segments 610 may be performed dynamically, and although such changes would alter the positions of the samples in Make-Ready Segments 610 on Press Color Bar 600, these changes do not alter the methods described. Such flexibility provides for enhanced make-ready procedures that may be dynamically adjusted to provide as much or as little data as necessary, without affecting the methods used. In comparison, a similar change in the position of the samples on, or the size of, the color bars of traditional or recently developed methods would typically require new inputs of distance and/or positional measurements of color samples to provide accurate adjustments to perform make-ready procedures.

Such advantages may also provide an operator valuable information about which keys may require adjustment and if so, the degree of adjustment necessary, and may permit enhanced precision in the control of the ink film thickness, which subsequently controls the solid ink density that may be measured at each control strip. The foregoing advantages may also allow more precise matching of solid, as well as tonal, densities for press output data to a proof, and may allow more precise calculation of adjustment values which may then be used to print a production job whose appearance more accurately matches a proof output. Moreover, these advantages offer simplicity and ease of adjustment of density variations that are independent of and may be used with virtually any printing press, regardless of the distance between the press ink fountain zone controls, the quantity of the zone controls, and the distance from the center of each ink fountain zone control to any reference point, and/or the printing press' dimensions.

Figure 7:
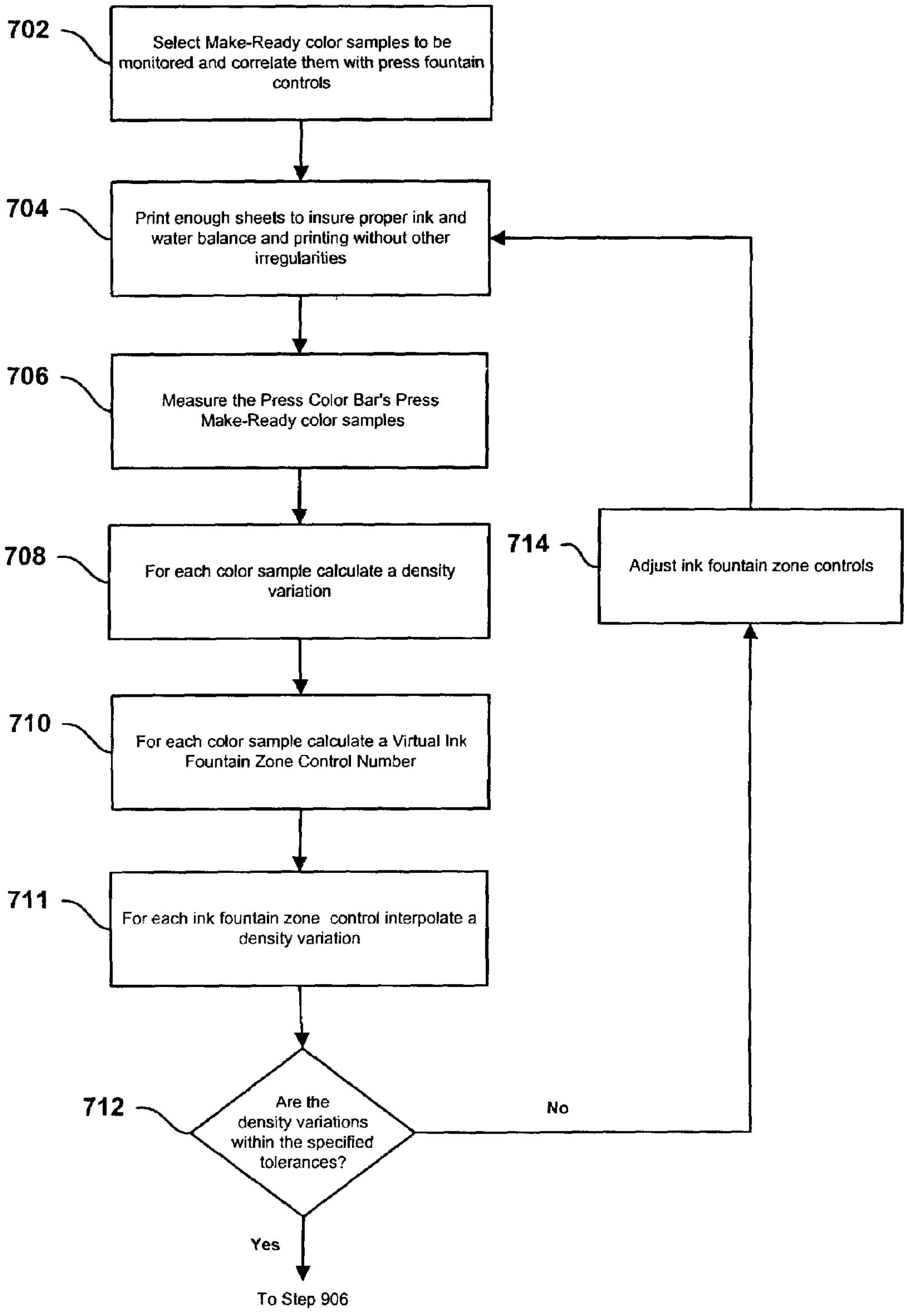
FIG. 7 is an example of a method for performing an improved press make-ready procedure in accordance with teachings of the present invention.
Figure 9:
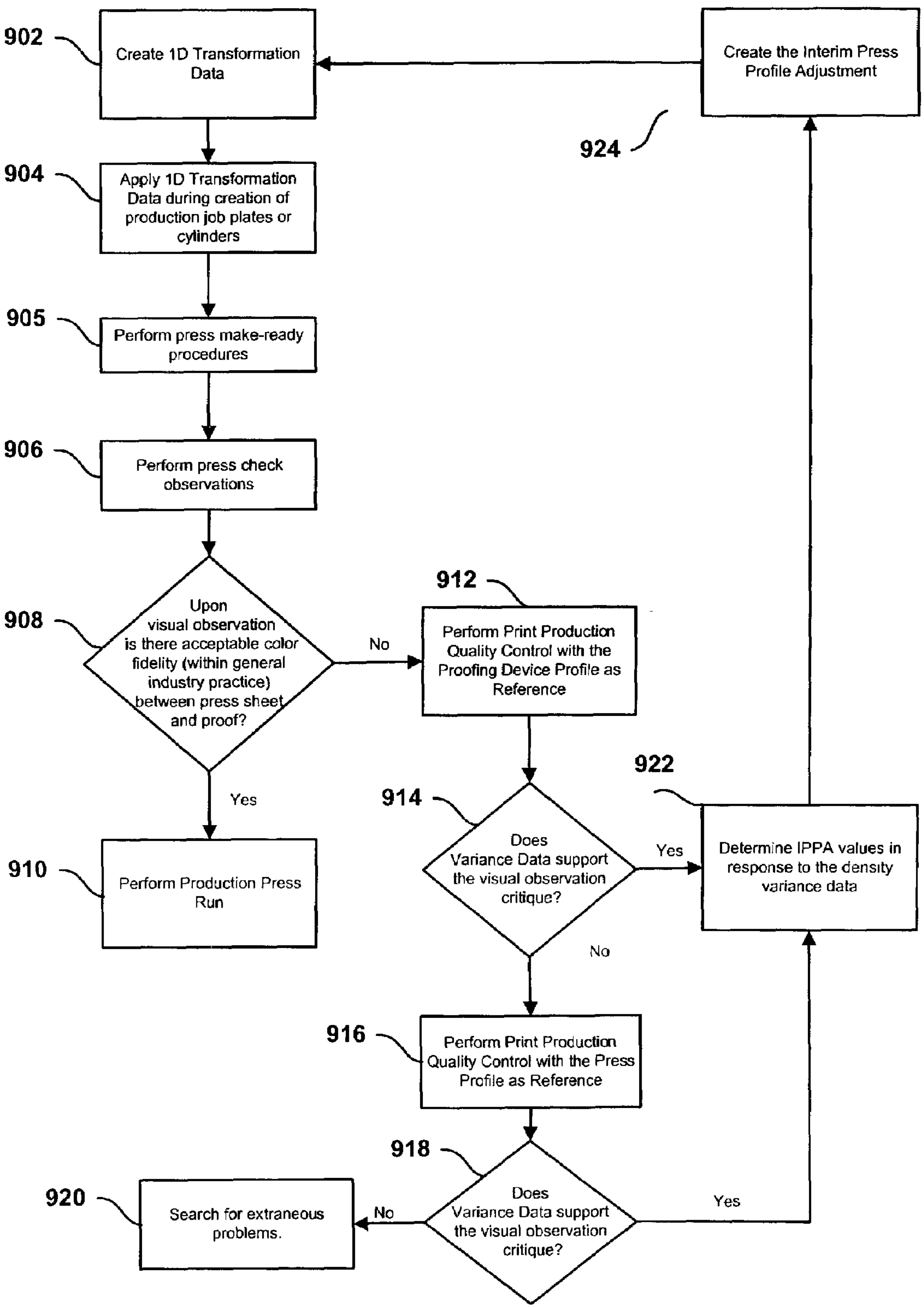
FIG. 9 is an example of a method for creating ID Transformation Data and applying the data in a production run in accordance with teachings of the present invention.

FIG. 7 is an example of a method for performing improved press make-ready procedures as described in FIG. 9. During this method, ink fountain zone controls may be adjusted to provide an appropriate level of ink on a paper/base substrate.

In step 702, those Make-Ready Segments that encompass live copy matter, or the encompassed segments, may be selected to be monitored. These Segments include end segments 605 and 606 and those Make-Ready Segments encompassed thereby. Each of the encompassed segments may then be correlated to vfc's as discussed above in conjunction with FIG. 6B. In step 704, a number of sheets may be printed. Although this number may vary with each application, enough sheets may be printed to ensure, among other things, proper ink and water balance, or that no other irregularities have occurred. In step 706, one of the sheets-printed in step 704 may be selected, and the selected Press Make-Ready color sample density values may be measured.

In step 708, make-ready density variation may be calculated for each of these color samples. In a particular embodiment, the make-ready density variation may be represented by the following equation:

Make-Ready Density Variation=Make-Ready Solid Major Density−*P* Aimpoint−(Solid Major Density−*P* of color sample)

In step 710, a vfc number (virtual zone control number) may be calculated to represent a value associated with each color sample. In a particular embodiment, a virtual zone control number may be represented by the equation:

Virtual Zone Control Number=Initial Virtual Zone Control+((Current Segment−First Segment+Color Sample Offset)* (Number of Zones/Number of Segments)), where Initial Virtual Zone Control=vfc that corresponds to a first end segment Color Sample Offset=offset positive or negative fraction of the width of a M−R segment Number of zones number of vfc's in live copy matter Number of Segments=number of encompassed segments included in live copy matter An example may be illustrative. Referring to the examples discussed in conjunction with FIG. 6B, initial virtual zone control equals 10.5; first segment equals 42 and the number of zone controls is 18.5−10.5=8; and the number of encompassed segments is 52−42=10. Thus, in this example virtual zone control number equals 10.5+((current segment −42+color sample offset)*8/10). The virtual zone control number then may be calculated for each of C, M, Y and K, for each current segment. Thus, here 10 Segments 42–52 correspond to 8 zones (10.5–18.5), a virtual zone control number may be calculated for Cyan sample 680 as illustrated in FIG. 6B as:

$$\text{Each segment} = \frac{8}{10} \text{ of 1 zone}$$

Cyan offset = .39 of 1 segment

-continued

Cyan sample 680 of segment 43 is 1.39 segments $$\text{from starting point or } \left(1.39 \times \frac{8}{10}\right) 1.112 \text{ zones}$$

Starting zone 10.5 + 1.112 = 11.612

Vfc numbers may be similarly calculated for all of the other color samples in encompassed Segments 42–52.

In step 711, for each ink fountain zone control, a density variation may be calculated using the density values measured for each color sample. For example, an interpolation may be performed between two nearest virtual zone control numbers using the make-ready density variations obtained in step 708.

make-ready density variation for an inkfountain zone control=(((*hvfc*−*fc*)/(*hvfc*−*lvfc*))**lvfcdenv*)+(((*fc*−*lvfc*)/(*hvfc*−*lvfc*))**hvfcdenv*), where fc=inkfountain zone control number vfc=virtual ink fountain zone control number hvfc=virtual inkfountain zone control>and closest to fc lvfc=vfc<and closest to fc lvfcdenv=make-ready density variation at lvfc hvfcdenv=make-ready density variation at hvfc Using the example above, and assuming a vcf of 11.3 has been assigned for Make-Ready Segment 43 for illustrative purposes, two nearest virtual zone controls may have values of 10.5 and 11.3. Assuming for illustrative purposes density variations for the color samples corresponding to the two virtual zone controls may be 0.10 and 0.20, respectively, the density variation for ink fountain zone control 11 may be calculated as:

$$\left(\frac{11.3-11}{11.3-10.5} * .10\right) + \left(\frac{11-10.5}{11.3-10.5} * .20\right) = 0.0375 + 0.125 = 0.1625$$

In step 712, the method queries whether the make-ready density variations are within desired tolerances. If so, then the method proceeds to step 906, where Press Check observations are performed. On the other hand, if the make-ready density variations are not within the desired tolerances, in step 714 an operator may make appropriate adjustments to the fountain key control settings by using the make-ready density variations as a guide to determine the degree of adjustment. For example, the press operator may adjust the press' ink fountain zone control 11 up to increase a resultant ink film density by 0.1625. This adjustment may be performed automatically or manually, and may involve a calculation between the desired increase in density of 0.1625 and a volume increase in ink or colorant to deliver to the press. The method then proceeds to step 704.

Figure 8:
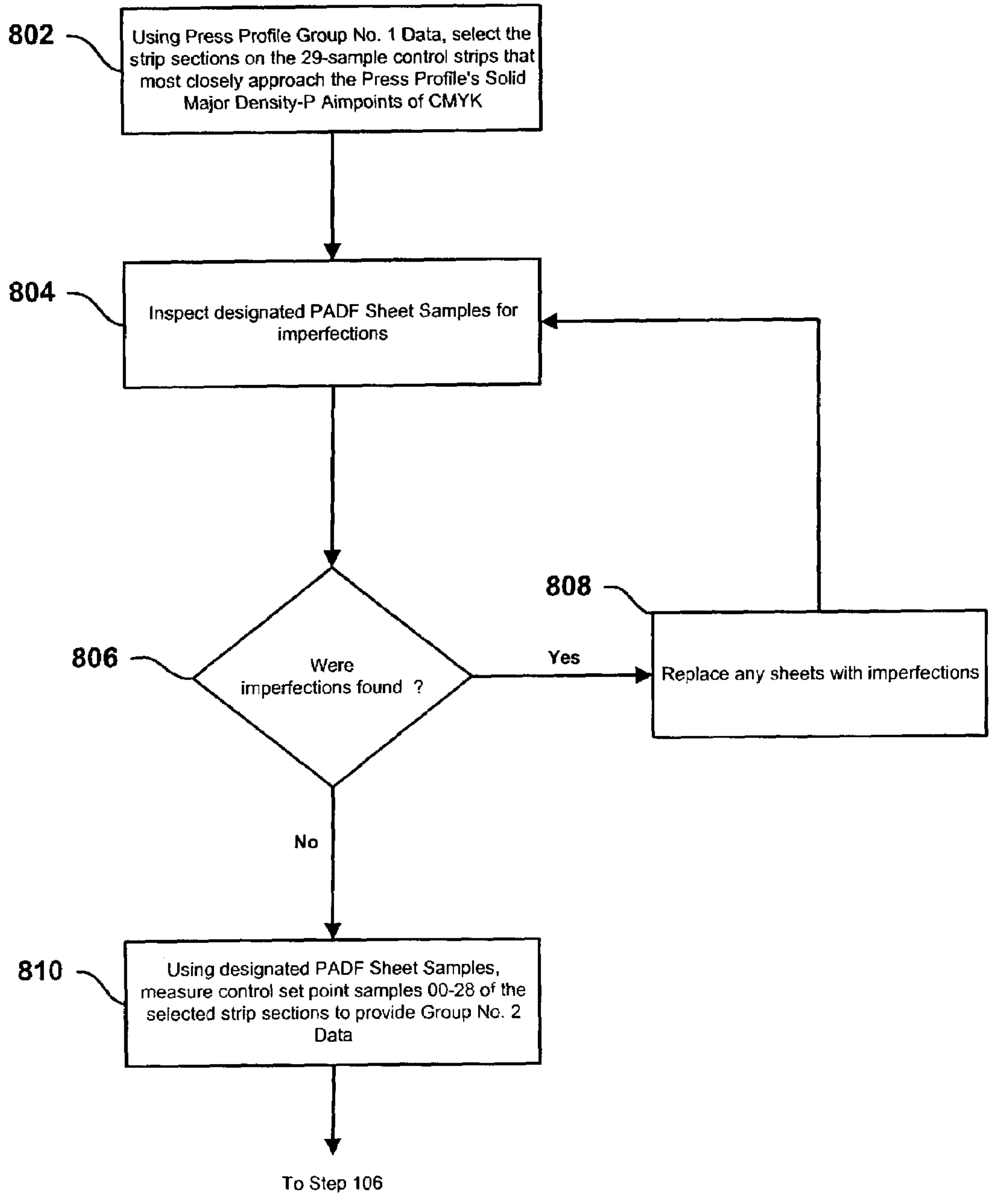
FIG. 8 is an example of a method for measuring data for a Press Profile in accordance with teachings of the present invention.

FIG. 8 is an example of a method for data measuring for a Press Profile which represents in more detail step 410 of FIG. 4. In step 802, Press Group No. 11 data may be used to select sections within control strips 201–221 of the PADF whose control set points 230–258 most closely approach the Press Profile's Solid Major Density-P Aimpoints for each C, M, Y, and K. These sections may or may not fall within an individual control strip. For example, measurements from the Press Group No. 1 data may indicate that control set point 231 (C) of a first control strip has a density value of 1.26; control set point 238 (M) of a second control strip has a density value of 1.33; control set point 245 (Y) of a third control strip has a density value of 0.92; and control set point 252 (K) of a fourth control strip has a density value of 1.61. These values most closely approach the Press Profile's Solid Major Density-P Aimpoints for each of C, M, Y, and K as defined in a particular embodiment. The ability to select sections of each of the control strips to more closely approach the Press Profile's Solid Major Density-P Aimpoints facilitates minimizing the mismatch of solid ink densities between a Proofing Device Profile and a Press Profile. In step 804, these selected sections may then be inspected for imperfections on designated PADF Sheet Samples. In a particular embodiment, these sheet samples may be identified as PADF Sheet Samples 2 of 9 through 9 of 9.

In step 806, a determination is made whether imperfections were found on any of the selected sections on any of the designated PADF Sheet Samples. If imperfections were found on any of these selected sections, the method proceeds to step 808, where those sheets in which imperfections were found may be replaced with one of the 15 spare sheets provided in step 606. From step 808, the method returns to step 804. If, at step 806, no imperfections were found on any of these selected sections, the method proceeds to step 810, where color densities for all control set points 230–258 for each of C, M, Y, K on the corresponding respective selected strip sections for C, M, Y, and K on the designated PADF Sheet Samples are measured to provide Press Group No. 2 Data. That is, measurements for control set points 230–258 may be taken from the first, second, third, and fourth control strips as noted in the example above.

FIG. 9 is an example of a method for creating 1D Transformation Data and applying the data to a production press run in accordance with teachings of the present invention. The method begins at step 902 where ID Transformation Data is created. One example for creating ID Transformation Data is described in further detail in conjunction with FIGS. 10–12.

In step 904, 1D Transformation Data may be applied during creation of production job plates or cylinders, and then in steps 905 and 906, press make-ready and press check observations of the production job may be performed. In a particular embodiment, improved press make-ready procedures may be performed in step 905 in accordance with teachings of the present invention. In step 908, the method queries whether there are acceptable color fidelity (within general industry practice) between the press sheet and the proof upon visual observation of the press sheet and the proof. If so, in step 910 the production test run is performed. During the production test run, press make-ready procedures as described in conjunction with FIG. 7 may also be performed from time to time or where desired to adjust ink fountain controls. If not, in step 912 print production quality control may be performed using the Proofing Device Profile as a reference to provide density variance data. One method for performing such print production quality control is discussed in conjunction with FIG. 13.

In step 914, the method queries whether density variance data supports a visual observation critique that is typically performed by a press operator or buyer. For example, if the measured data for Cyan reveals a −0.05 density variance at a 50% control set point, the visual observation should yield a press sheet that is "weak" in Cyan in comparison to the proof. If not, in step 916 print production quality control may be performed using the Press Profile as a reference to provide density variance data. One method for performing such print production quality control is discussed in conjunction with FIG. 14. In step 918, the method queries whether density variance data supports the visual observation critique. If not, in step 920, extraneous problems such as, but not limited to, proofing, plate making, and/or ink specifications are searched for. If none are found, the graphic file may require additional prepress color correction, and the method ends.

If density variance data does support the visual observation critique in either of steps 914 or 918, in step 922 density variance data may be used to determine IPPA values. These values may be used to create an IPPA in step 924, and then the method returns from step 924 to step 902. One method for providing IPPA values is discussed in conjunction with FIG. 6A.

Figure 10:
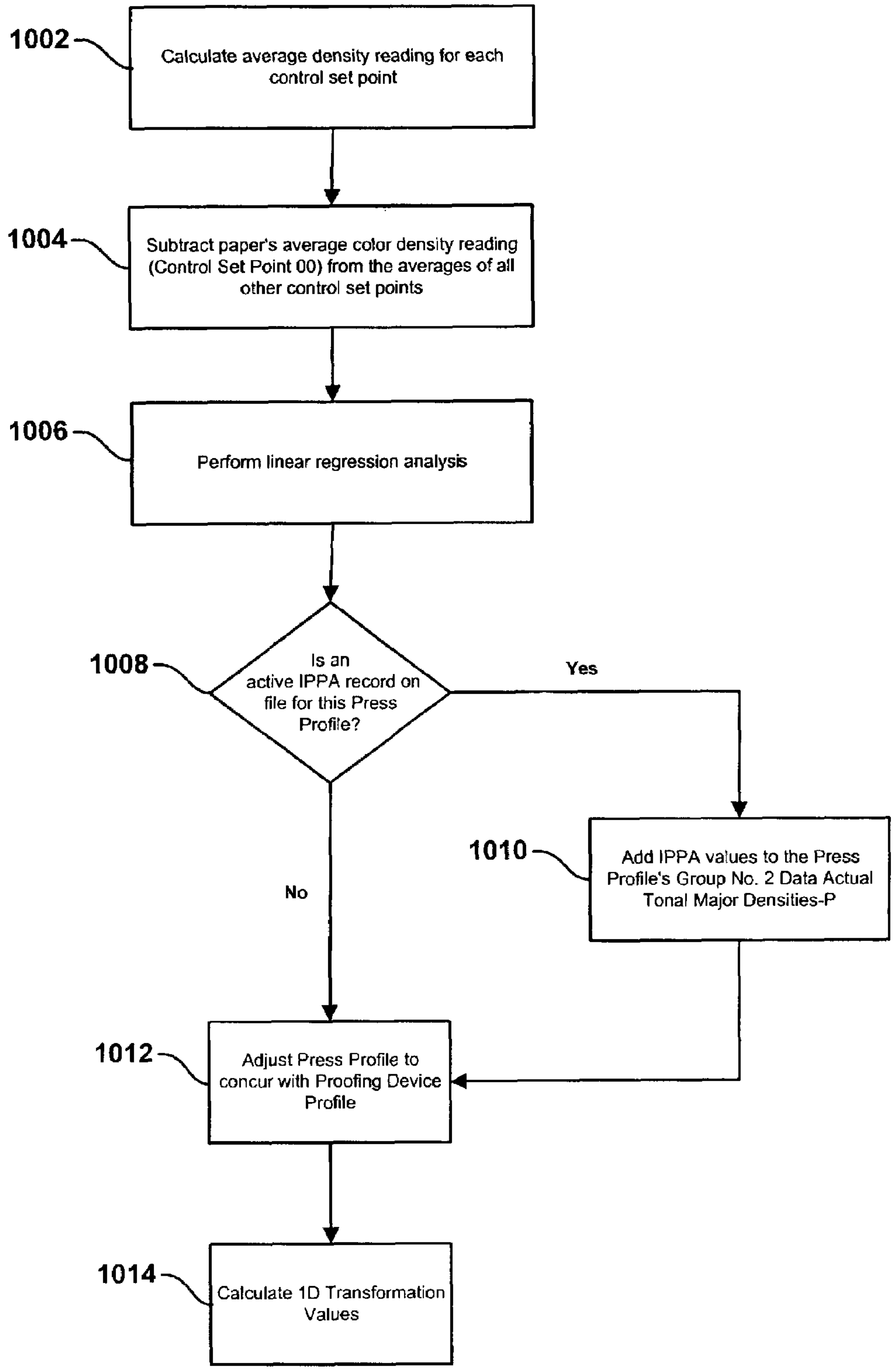
FIG. 10 is an example of a method for creating ID Transformation Data in accordance with teachings of the present invention.

FIG. 10 is an example of a method for calculating 1D Transformation Data that represents in more detail step 902. Method 1000 begins at step 1002, in which an average for each control set point in the Press Group No. 2 data gathered in step 810 is calculated. In a particular embodiment, the greatest and least color density value for each sample may be ignored. In step 1004, the paper's average color density (i.e., an average of measurements for control set points 00) may be subtracted from the averages of all other control set points to provide measurements for Press Profile Actual Solid and Tonal Major Densities-P.

In step 1006, a linear regression analysis may be performed using Press Group No. 1 data to provide a slope that may later be used to adjust Press Profile densities. In a particular embodiment, only those data points within a tolerance such as +/−0.12 of the Proofing Device Profile's Solid Major Densities-P may be considered. Such data points may provide accurate data where, for example, the density varies a total of 0.50 across the PADF. In other applications, other data points may be considered. Alternatively or in addition, other statistical analyses may be used, including non-linear regression techniques. Where Press No. 1 Data and/or Press No. 2 Data are gathered from all of the press sheets as discussed above in conjunction with FIG. 4, a regression analysis may consider some or all of this data.

In step 1008, the method queries whether active IPPA values exist for this Press Profile. If so, the method in step 1010 adds adjustment values from the IPPA to the appropriate tonal major densities of the Press Profile, in this case the Press Profile's Actual Tonal Major Densities-P, and then proceeds to 1012. If there is no active IPPA record on file, the method proceeds directly to step 1012 from step 1008. In step 1012, the Press Profile may be adjusted to concur with, or more closely approximate values in, the Proofing Device Profile. For example, the Press Profile's Actual Solid Major Densities-P for each of C, M, Y, and K may be adjusted to more closely approximate the Proofing Device Profile's Solid Major Densities-P for each of C, M, Y and K, respectively. These values are the Press Profile's Adjusted Solid Major Densities-P. Similarly, the Press Profile's Actual Tonal Major Densities-P may be adjusted in response to the Press Profile's Adjusted Solid Major Densities-P. One method for performing these adjustments is discussed in conjunction with FIG. 11 In step 1014, ID Transformation values are calculated.

Figure 11:
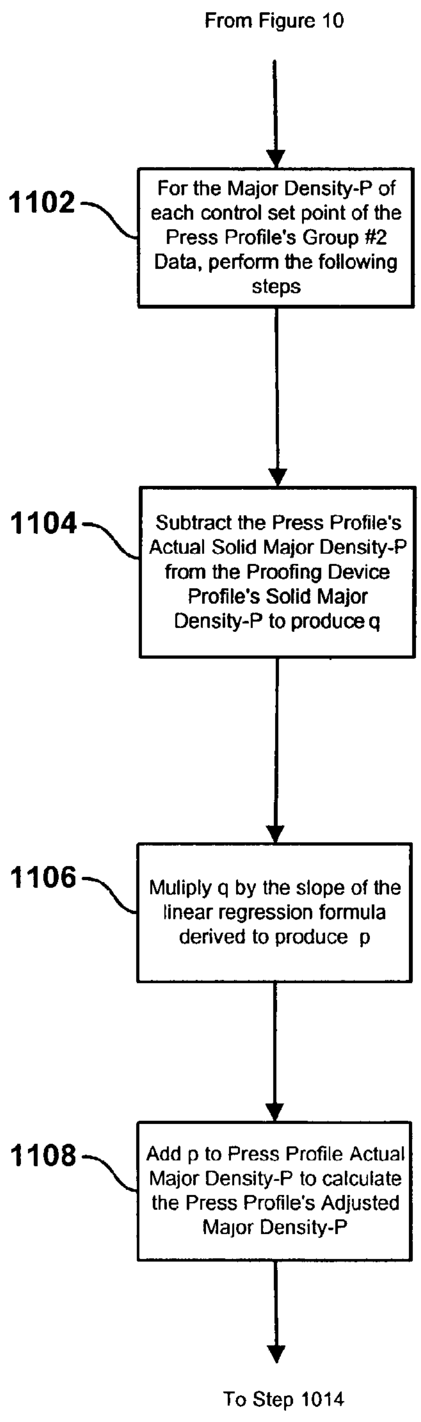
FIG. 11 is an example of a method for adjusting of Press Profile major densities to account for differences between a Proofing Device Profile and a Press Profile in accordance with teachings of the present invention.

FIG. 11 is an example of a method for adjusting the Press Profile to more closely approximate values in a Proofing Device Profile that represents in more detail step 1012 of FIG. 10. This adjustment may be made to tonal major densities of CMYK to correct for differences between the Press Profile Actual Solid Major Densities-P and the Proofing Device Profile's Solid Major Densities-P by adjusting the tonal major densities in proportion to differences between the Press Profile Actual Solid Major Densities-P and the Proofing Device Profile's Solid Major Densities-P.

The method begins in step 1102 where, for each of the Solid or Tonal Major Density-P of each control set point of C, M, Y, and K of Press Group No. 2 data, steps 1106 and 1108 are performed. In step 1104, the Press Profile's Actual Solid Major Density-P is subtracted from the Proofing Device Profile's Solid Major Density-P for that control set point of C, M, Y, and K. This step is performed for all Solid Major Density-P control set points of C, M, Y, and K of Press Group No. 2 Data. In step 1106, the result of the operation at step 1108 is multiplied by the slope of the applicable regression formula derived in step 1006. The method then proceeds to step 1108, in which the result of step 1106 is added to the respective Press Profile's Solid or Tonal Major Density-P value for the control set point to calculate the respective Press Profile Adjusted Major Density-P value for that control set point.

Figure 12:
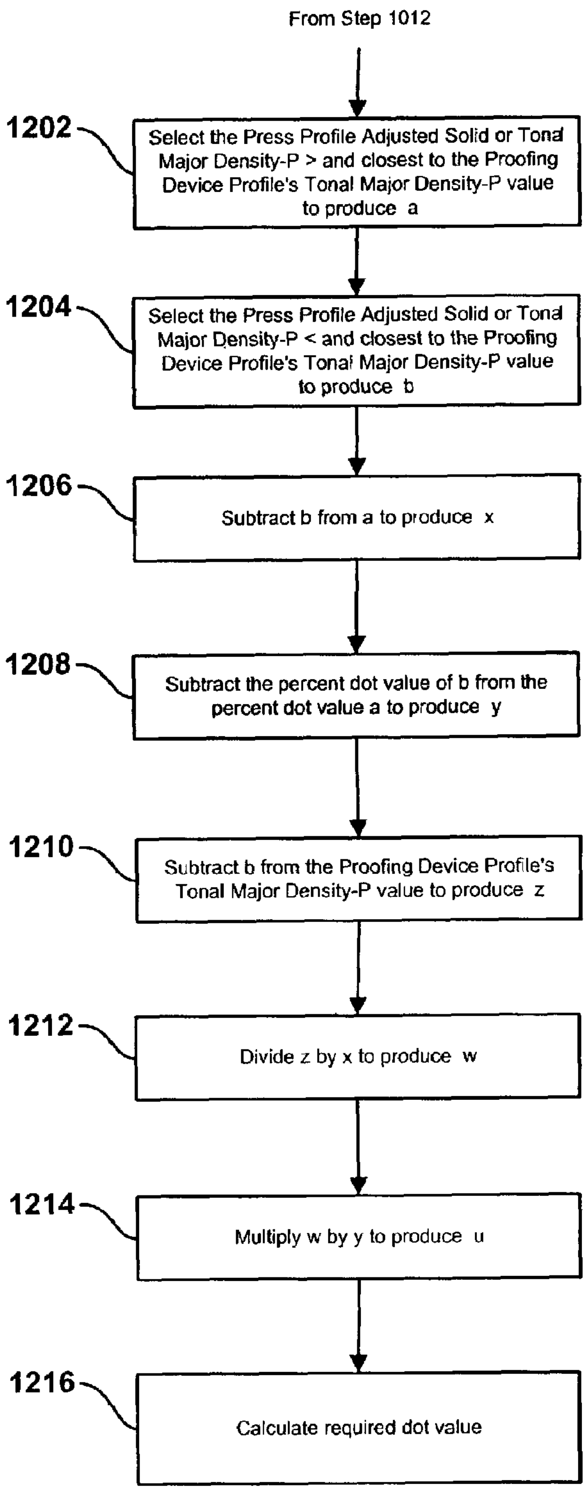
FIG. 12 is an example of a method for creating ID Transformation Data values in accordance with teachings of the present invention.

FIG. 12 is an example of a method for calculating 1D Transformation Data Values that represents in more detail of step 1014. The Transformation Data permit adjustment of the percent dot values of the CTP plate. In this way, the printing press' output (e.g., a second image, which is most often a production run image) is calibrated to the proof so that the color densities of a printed image more closely approximates the color densities of the corresponding proof. The method of FIG. 12 provides in a preferred embodiment, a process to calculate adjustments to percent dot values, so that the half-tone or tonal color density values of the proof and press more closely match one another.

Method 1200 is performed for each control set point of C, M, Y, and K, and begins at step 1202, where the Press Profile control set point density reading greater than and closest to the Proofing Device Profile's Tonal Major Density-P value for each control set point of each of CMYK is selected.

$a$=Press Profile Adjusted Solid or Tonal or Density−$P$that is>and closest to the Proofing Device Profile's Tonal Major Density−$P$value In step 1204, the Press Profile control set point density reading less than and closest to the Proofing Device Profile's tonal major density value is selected.

$b$=Press Profile Adjusted Solid or Tonal Major Density−$P$that is<and closest to the Proofing Device Profile's Tonal Major Density−$P$value In step 1206, the difference x in color densities between the two values a and b is calculated. In step 1208, the percent dot value associated with the Press Profile control set point selected in step 1202 is subtracted from the percent dot value of the Press Profile control set point selected at step 1204.

$y$=Percent Dot Value($a$)−Percent Dot Value ($b$)

In step 1210, the result of step 1204 is subtracted from the Proofing Device Profile's Tonal Major Density-P value.

$z$=Proofing Device Profile Tonal Major Density−$P$value−$b$

In step 1212, the result of step 1210 is divided by the result of step 1206.

$$w=z/x$$

A screened, or tonal, percent dot adjustment u may be calculated in step 1214 by multiplying w*y:

$$u=w*y$$

In step 1216 a dot size that is required to yield the Proofing Device Profile's Tonal Major Density-P value (the "Required Dot Size") is calculated:

Required Dot Size=Percent Dot Value($b$)+$u$

This data may then be applied to the production print job CTP plate data for each control set point of each CMYK in order to calibrate the printing press, as described in step 108 of FIG. 1.

An example may be illustrative. For a Proofing Device Profile's Tonal Major Density-P value of 0.20 having a 25 percent dot value, two Press Profile Adjusted Solid or Tonal Major Density-P values may be selected for the values a and b in steps 1202 and 1204. In this example, a first Press Profile Adjusted Solid or Tonal Major Density-P value of 0.30 that is > and closest to the Proofing Device Profile's Tonal Major Density-P value has a 25 percent dot value provides for a =1.11. Similarly in this example, a second Press Profile Adjusted Solid or Tonal Major Density-P value of 0.10 that is < and closest to the Proofing Device Profile's Tonal Major Density-P value has a ten percent dot value provides for b=0. 1. Proceeding through steps 1206–1216 yields x =0.2; y=15 percent; z=0.1; w=0.1/0.2=0.5; u=0.5*15%=7.5 percent, and a Required Dot Size of 10+7.5=17.5 percent.

Figure 13:
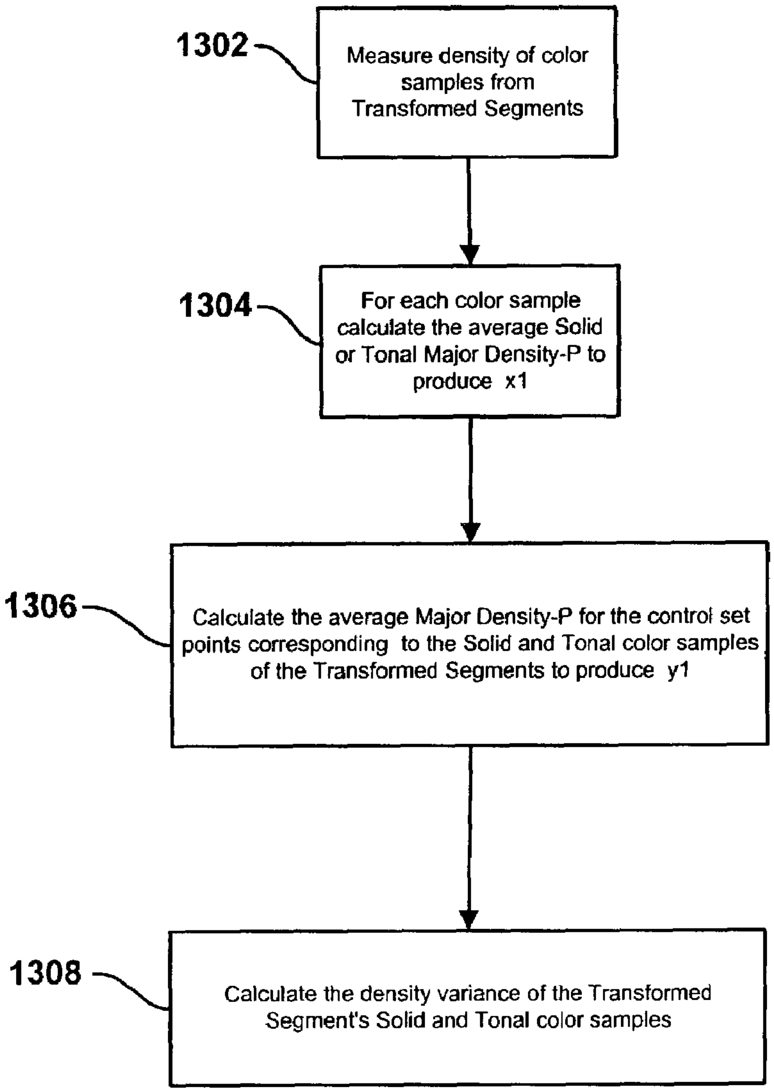
FIG. 13 is an example of a method for performing print production quality control in accordance with teachings of the present invention.

FIG. 13 is an example of a method for performing print production quality control using a Proofing Device Profile as a reference, as discussed in step 912. In step 1302, color samples may be measured (e.g., by providing a density reading) from one or more of the Press Color Bars' Transformed Segments 600A, B, C, and/or D. This method may be advantageous in providing more control of the solid densities for a Proofing Device Profile than may be possible with conventional systems.

In step 1304, the method calculates a result for each sample, as represented by the value X1 (sample). In a particular embodiment:

$X1$(sample)=average Solid or Tonal Major Density−$P$ (sample) of multiplesegments In other words, density values for control set point T-02 may be measured for Transformed Segments 600A, B, C, and/or D.

In step 1306, a value for each sample, as represented by the value Y1 (sample) may be calculated for the average Major Density−P for the referenced Proofing Device Profile for the control set points corresponding to the tonal and solid color samples (e.g., 100, 75, 50, and 25 percent dot values) of Transformed Segments 600A, B, C, and/or D. In step 1308, the method calculates density variance data between the Transformed Segments' solid and tonal color samples and the Proofing Device Profile by subtracting Y1 from X1.

Figure 14:
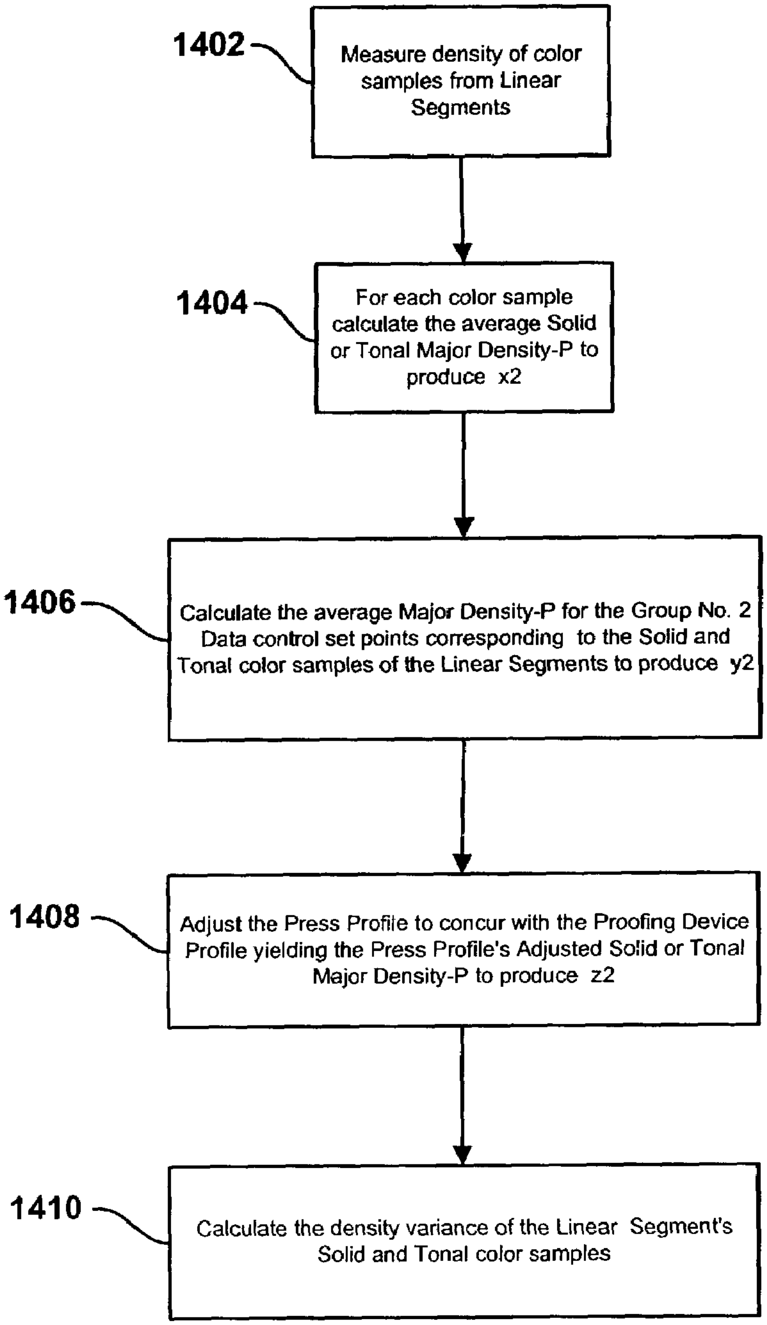
FIG. 14 is an example of another method for performing print production quality control in accordance with teachings of the present invention.

FIG. 14 is an example of a method that may be used to perform print production quality control with a Press Profile as a reference, as described in step 918 of FIG. 9. In step 1402, color samples may be measured (e.g., by providing a density reading) from one or more of the Press Color Bars' Linear Segments 601, 602, 603, and/or 604. In step 1404, the method calculates a resulting average for each sample, as represented by the value X2 (sample). In a particular embodiment, $X2$(sample)=average Solid or Tonal Major Density−$P$ (sample)

In step 1406, a Press Profile Actual Solid or Tonal Major Density-P value, as represented by the value Y2 (sample), may be calculated using the average Major Density−P for the referenced Press Profile for the Group No. 2 Data control set points corresponding to the tonal and solid color samples (e.g., 100, 75, 50 and 25 percent dot values) of Linear Segments 601, 602, 603, and/or 604. In step 1408, the Press Profile may be adjusted from Y2 to more closely approximate values in the Proofing Device Profile to yield a value Z2, the Press Profile's Adjusted Solid or Tonal Major Density-P. One method for such adjustment is discussed in conjunction with FIG. 11. In step 1410, the method calculates density variance data between the Press Profile and the Linear Segments Solid and Tonal color samples by subtracting Z2 from X2.

FIG. 15 is a block diagram of a printing adjustment system 1500. System 1500 includes a computer 1520 that may be coupled to a number of elements, including a communication link 1515. For example, computer 1520 may be coupled through communication link 1515 to a computer network, a telephone line, an antenna, gateway, or any other type of communication link. Computer 1520 may also be coupled to an input device 1510, a proofing device 1540, and/or a press output device 1550. Press output device 1550 may be any printing device such as an offset lithographic production printing press that is capable of providing printed products using presses such as offset lithography, letter press, flexography, gravure and screen printing. In such an embodiment, data may be transferred to and/or received from proofing device 1540 and/or press output device 1550 to provide automated data transfer for running a print production job.

Computer 1520 may be a general or a specific purpose computer and may include a processor 1522, a memory 1524, which may include random access memory (RAM) and read only memory (ROM). Computer 1520 may be used to execute one or more printing adjustment applications 1526 that may be stored in memory 1524 and/or an input/output device 1512. Results may be displayed using a display 1516 and/or stored in input/output device 1512, which may be any suitable storage medium. Data processing may be performed using special purpose digital circuitry contained either in computer 1520 or in a separate device. Such dedicated digital circuitry may include, for example, application-specific integrated circuitry (ASIC), state machines, fuzzy logic, as well as other conventional circuitry. Computer 1520 may be adapted to execute any of the well-known MS-DOS, PC-DOS, OS2, UNIX, MAC-OS, and Windows operating systems or other operating systems including unconventional operating systems.

Input device 1510 may be a color density measurement device such as a spectrophotometer, densitometer, scanner, or any other device operable to provide density values. Alternatively, color density measurements can be performed manually by providing values with, for example, a scanner, spectrophotometer, or densitometer and then by inputting the resulting measurements using a keyboard 1514 or other means.

Additional input/output devices can be included for reading and storing files and for communication. No particular type hardware or software platform is required for carrying out the present invention, so long as it is capable of executing the processes herein described. Alternatively, in place of computer 1520, the present invention can be programmed for execution on or in conjunction with a network of computers, including a system accessible via the Internet, such as on a computer or server computer which executes the programs and/or stores data files. For example, adjustments may be provided to computer 1520 in electronic form using a floppy disk, communication link 1515, or a combination of both. A production print job may then be run using press output device 1550.

The methods of FIGS. 1, 3–5, and 7–14 may be performed on the computer. These methods may be performed using a variety of logical or functional configurations, and may be performed in multiple or single steps. These methods may also omit various steps, depending on the embodiment. These methods may utilize any language, including object-oriented, Fortran, C, and other languages, and in a particular embodiment may be written in a high-level language such as Clipper. These methods may be stored in machine-readable form on CD-ROM, magnetic disk, or other media, are accessible via the Internet, or are downloadable for input into a computer such as that illustrated in FIG. 1500.

While the invention has been particularly shown and described in several embodiments by the foregoing detailed description, a myriad of changes, variations, alterations, transformations and modifications may be suggested to one skilled in the art and it is intended that the present invention encompass such changes, variations, alterations, transformations and modifications as fall within the spirit and scope of the appended claims.

What is claimed is:

1. A printing adjustment method, comprising:

providing a plurality of solid and screened density values produced by a proofing device that represent intended density values;

providing a plurality of solid and screened density values produced by a press output device; and calculating, in response to selected ones of the plurality of density values produced by the press output device and selected ones of the plurality of density values produced by the proofing device, required percent dot values to be used to print on the press output device a plurality of adjusted density values that approximately correspond to the intended density values.

2. The method of claim 1, wherein calculating comprises:

selecting from the plurality of solid density values produced by the press output device values that approximately correspond to solid density aimpoints;

providing a statistical representation of the selected values;

performing a regression analysis of the selected values that approximately correspond to solid density aimpoints, using ones of the plurality of solid density values produced by the press output device that approximately correspond to the selected values that approximately correspond to solid density aimpoints;

applying first adjustments to at least one of the density values produced by the press output device, in response to the regression analysis and at least one of the density values produced by the proofing device; and using interpolation in response to the first adjustments to provide the required percent dot values.

3. The method of claim 1, wherein calculating includes performing a regression analysis that provides a mathematical relationship between at least one of the screened density values produced by the press output device and at least one of the solid density values produced by the press output device.

4. The method of claim 1, wherein calculating includes using interpolation that comprises adjusting at least one of the screened density values produced by the press output device in response to an amount proportional to a product of a first value and a second value, wherein the first value is a percent dot value of a difference between two of the screened density values produced by the press output device, and the second value is a ratio of a difference between at least one of the intended density values and one of the two of the screened density values produced by the press output device to the difference between the two of the screened density values produced by the press output device.

5. The method of claim 1, wherein the density values represent values from which a density of a substrate on which the density values produced by the press output device have been provided has been subtracted.

6. The method of claim 1, further comprising printing an image using the required dot values.

7. The method of claim 1, wherein the plurality of solid density values produced by the press output device are varied approximately linearly in density along a first axis, the first axis approximately perpendicular to direction in which output of the press output device is produced.

8. The method of claim 7, wherein the approximately linear density variation is produced by variation in ink-film thickness.

9. The method of claim 1, wherein the screened density values include values selected from the group consisting of 5, 10, 25, 50, 75, and 90 percent dot.

10. The method of claim 1, further comprising compensating for fluctuations in printing press or peripheral printing conditions' printing characteristics using interim press profile adjustments.

11. The method of claim 1, further comprising providing a plurality of segments produced by the press output device having a plurality of ink fountain zone controls, each of the segments having a width, a plurality of segment solid density color values each having an offset value measurable as a fraction of the width, and a segment center;

identifying at least a portion of the segments as encompassed segments relative to designated copy matter to be printed by the press output device, the encompassed segments having a first end segment and a second end segment;

calculating color density variations for at least a portion of the plurality of segment solid density color values; and calculating, in response to the offset values and at least a portion of the color density variations, adjustment data for at least one of the ink fountain zone controls, the adjustment data operable to be used to adjust ink deliverable by the ink fountain zone control.

12. The method of claim 1, further comprising:

providing one of the group consisting of linear or transformed segments, each having a second plurality of solid and screened density values produced by the press output device;

automatically calculating density variance data between a statistical representation of at least a subset of the plurality of solid and screened density values produced by the press output device and corresponding representations of ones of at least a subset of the second plurality of solid and screened density values, the density variance data operable to be used to automatically calculate tonal reproduction adjustment values, the tonal reproduction adjustment values to be used to produce the required percent dot values.

13. A printing adjustment data form, comprising:

a plurality of solid color control regions produced by a press output device, the solid color control regions corresponding to positions approximately along an axis;

a plurality of screened color control regions produced by the press output device; and wherein density values for at least two of the plurality of solid color control regions are intentionally varied using predetermined values along the axis.

14. The printing adjustment data form of claim 13, wherein the density values are varied approximately linearly along the axis.

15. The printing adjustment data form of claim 13, wherein the density values are varied by regulating ink-film thickness along the axis.

16. The printing adjustment data form of claim 13, wherein the location of at least one of the regions approximately corresponds to a position of an ink fountain zone control on the press output device.

17. The printing adjustment data form of claim 13, wherein the density value for at least one of the solid color control regions is selected if it corresponds to a selected target density value within a desired tolerance value.

18. The printing adjustment data form of claim 13, wherein density values from selected ones of the plurality of solid color control regions produced by the press output device are operable to be compared to intended density values from color control regions produced by a proofing device, density values from the plurality of screened color control regions produced by the press output device are operable to be adjusted in response to the comparison, and required percent dot values are calculated in response to the adjustment, and wherein the required percent dot values are used to print on the press output device a plurality of adjusted density values that approximately correspond to the intended density values.

19. A printing system, comprising:

a press output device operable to print image data having density values; and a computer operable to provide input data to the press output device, the computer further operable to read a plurality of solid and screened density values produced by a proofing device that represent intended density values;

read a plurality of solid and screened density values produced by the press output device; and calculate, in response to selected ones of the plurality of density values produced by the press output device and selected ones of the plurality of density values produced by the proofing device, required percent dot values to be used to print on the press output device a plurality of adjusted density values that approximately correspond to the intended density values.

20. The system of claim 19, wherein the press output device input data includes data utilized with at least one of the group consisting of CTP plates, cylinders, interim film, and direct imaging technology.

21. The system of claim 19, wherein the density values are provided by one of the group consisting of a spectrophotometer, a densitometer and a scanner.

22. The system of claim 19, wherein the computer is further operable to calculate by including:

selecting from the plurality of solid density values produced by the press output device values that approximately correspond to solid density aimpoints;

providing a statistical representation of the selected values;

performing a regression analysis of the selected values that approximately correspond to solid density aimpoints, using ones of the plurality of solid density values produced by the press output device that approximately correspond to the selected values that approximately correspond to solid density aimpoints;

applying first adjustments to at least one of the density values produced by the press output device, in response to the regression analysis and at least one of the density values produced by the proofing device; and using interpolation in response to the first adjustments to provide the required percent dot values.

23. The system of claim 19, wherein the computer is further operable to calculate by including performing a regression analysis that provides a mathematical relationship between at least one of the screened density values produced by the press output device and at least one of the solid density values produced by the press output device.

24. The system of claim 19, wherein the computer is further operable to calculate by including using interpolation that comprises adjusting at least one of the screened density values produced by the press output device in response to an amount proportional to a product of a first value and a second value, wherein the first value is a percent dot value of a difference between two of the screened density values produced by the press output device, and the second value is a ratio of a difference between at least one of the intended density values and one of the two of the screened density values produced by the press output device to the difference between the two of the screened density values produced by the press output device.

25. The system of claim 19, wherein the plurality of solid density values produced by the press output device are varied approximately linearly in density along a first axis, the first axis approximately perpendicular to a direction in which a substrate on which the image data is produced is processed through the press output device.

26. The system of claim 19, wherein the computer is further operable to include compensating for fluctuations in printing press or peripheral printing conditions' printing characteristics using interim press profile adjustments.

27. A printed image, comprising:

a substrate;

image data produced by a press output device residing on the substrate, the image data produced in response to required percent dot values automatically calculated in response to selected ones of a first plurality of solid and screened density values representing intended density values and selected ones of a second plurality of solid and screened density values, the required percent dot values produced by the press output device providing adjusted density values that approximately correspond to the intended density values; and wherein the first plurality of solid and screened density values is produced by a proofing device and the second plurality of solid and screened density values is produced by the press output device.

28. The image of claim 27, wherein the image data includes data produced by at least one of the group consisting of CTP plates, cylinders, interim film, and direct imaging technology.

29. The image of claim 27, wherein the required percent dot values are calculated by including performing a regression analysis that provides a mathematical relationship between at least one of the screened density values produced by the press output device and at least one of the solid density values produced by the press output device.

30. The image of claim 27, wherein at least solid density values of the second plurality of solid and screened density values are varied approximately linearly in density along a first axis, the first axis approximately perpendicular to a direction in which the substrate on which the image data resides is processed through the press output device.

31. The image of claim 27, wherein the required percent dot values are calculated by including using interpolation that comprises adjusting at least one of the screened density values produced by the press output device in response to an amount proportional to a product of a first value and a second value, wherein the first value is a percent dot value of a difference between two of the screened density values produced by the press output device, and the second value is a ratio of a difference between at least one of the intended density values and one of the two of the screened density values produced by the press output device to the difference between the two of the screened density values produced by the press output device.

32. The image of claim 27, wherein the required percent dot values are calculated by including compensating for fluctuations in printing press or peripheral printing conditions' printing characteristics using interim press profile adjustments.

33. A printing adjustment application, comprising:

a computer-readable medium;

software residing on the computer-readable medium and operable to:

determine a mathematical relationship between a density value of a first plurality of solid color regions of image data produced by a press output device and a density value of a plurality of screened color regions of image data produced by the press output device, wherein the first plurality of solid color regions of image data produced by the press output device are intentionally varied using predetermined values;

adjust, in response to the mathematical relationship, the density value of the plurality of screened color regions of image data produced by the press output device and a density value of ones of a second plurality of solid color regions of image data produced by a press output device selected in response to a plurality of solid color regions of image data produced by a proofing device, wherein the plurality of solid color regions of image data produced by the proofing device represent intended density values;

interpolate by adjusting at least one of the plurality of screened color regions of image data produced by the press output device in response to an amount proportional to a product of a first value and a second value, wherein the first value is a difference between percent dot values of two of the plurality of screened color regions of image data produced by the press output device, and the second value is a ratio of a difference between at least one of the intended density values and one of the two of the plurality of screened color regions of image data produced by the press output device to the difference between the two of the plurality of screened color regions of image data produced by the press output device; and determine a required percent dot value in response to the interpolation, the required percent dot value operable to cause the color density value of at least one of the regions of the image data produced by the press output device to approach the intended density values of the corresponding region produced by the proofing device.

34. The application of claim 33, wherein the plurality of solid color regions of image data produced by the press output device is varied approximately linearly in density along a first axis, the first axis approximately perpendicular to a direction in which a substrate on which the image data is processed through the press output device.

35. The application of claim 33, wherein the software is further operable to compensate for fluctuations in printing press or peripheral printing conditions' printing characteristics using interim press profile adjustments.

36. The application of claim 33, wherein the first plurality of solid color regions of image data produced by the press output device is intentionally varied by variation in ink-film thickness.

37. The application of claim 33, wherein the screened density values include values selected from the group consisting of 5, 10, 25, 50, 75, and 90 percent dot.

38. The application of claim 33, wherein the software is further operable to identify at least a portion of the plurality of segments produced by the press output device as encompassed segments relative to designated copy matter to be printed by the press output device, the encompassed segments having a first end segment and a second end segment, and each of the segments having a width, a plurality of segment solid density color values each having an offset value measurable as a fraction of the width, and a segment center;

calculate color density variations for at least a portion of the plurality of segment solid density color values; and calculate, in response to the offset values and at least a portion of the color density variations, adjustment data for at least one of a plurality of ink fountain zone controls of the press output device, the adjustment data operable to be used to adjust ink deliverable by the at least one of the plurality of ink fountain zone controls.

39. A printing adjustment method, comprising:

providing a first plurality of solid and screened density values, the first plurality produced by a press output device;

providing a second plurality of solid and screened density values;

automatically calculating density variance data between a statistical representation of at least a subset of the first plurality of solid and screened density values and corresponding representations of ones of at least a subset of the second plurality of solid and screened density values, the density variance data operable to be used to automatically calculate tonal reproduction adjustment values to produce data on the press output device before performing a print production run.

40. The method of claim 39, wherein the second plurality of solid and screened density values is produced by a proofing device and represent intended density values to be printed on the press output device during the production run.

41. The method of claim 39, wherein the second plurality of solid and screened density values is produced by the press output device and the corresponding representations of ones of at least a subset of the second plurality of solid and screened density values include adjustments made in response to a plurality of solid and screened density values produced by a proofing device, the plurality of solid and screened density values produced by the proofing device representing intended density values to be printed on the press output device during the production run.

42. The method of claim 39, further comprising:

providing a third plurality of solid and screened density values, the third plurality produced by the press output device;

automatically calculating additional density variance data between a statistical representation of at least a subset of the first plurality of solid and screened density values and corresponding representations of ones of at least a subset of the third plurality of solid and screened density values, the additional density variance data operable to be used to automatically calculate tonal reproduction adjustment values to produce data on the press output device before performing the print production run; and wherein the first plurality of solid and screened density values includes transformed segments and linear segments and the second plurality of solid and screened density values is produced by a proofing device and represent the intended density values to be printed on the press output device during the production run.

43. The method of claim 39, wherein the first plurality of solid and screened density values include values selected from the group consisting of 5, 10, 25, 50, 75, 90, and 100 percent dot.

44. The method of claim 39, further comprising:

providing press profile data from the press output device;

providing proofing device profile data; and automatically, when desired, calculating adjustment values in density that correspond to percent data values to be printed on the press output device in response to at least one of the group consisting of the press profile data and the proofing device profile data, the adjustment values operable to reduce effects on image data produced by the press output device, the effects resulting from fluctuations in at least one of printing and peripheral printing conditions' printing characteristics.

45. A printing adjustment method, comprising:

providing press profile data from a press output device;

providing proofing device profile data; and automatically, when desired, calculating adjustment values in density that correspond to percent data values to be printed on the press output device in response to at least one of the group consisting of the press profile data and the proofing device profile data, the adjustment values operable to reduce effects on image data produced by the press output device, the effects resulting from fluctuations in at least one of printing and peripheral printing conditions' printing characteristics.

46. The method of claim 45, wherein the printing and peripheral printing conditions' printing characteristics are selected from characteristics of the group consisting of paper, ink, plate, fountain solutions, image transferring cylinder blankets, press mechanical settings, ambient air conditions, ambient moisture conditions, ambient temperature conditions, and chemical residue conditions.

47. The method of claim 45, wherein the press profile data comprises density values provided from:

a plurality of solid color control regions produced by the press output device, the solid color control regions corresponding to positions approximately along an axis;

a plurality of screened color control regions produced by the press output device; and wherein the density values for at least two of the plurality of solid color control regions are intentionally varied using predetermined values along the axis.

48. The method of claim 45, wherein the density values for at least two of the plurality of solid color control regions are varied approximately linearly along the axis.

49. A printing adjustment method, comprising:

providing a plurality of segments produced by a press output device having a plurality of ink fountain zone controls, each of the segments having a width, a plurality of segment solid density color values each having an offset value measurable as a fraction of the width, and a segment center;

identifying at least a portion of the segments as encompassed segments relative to designated copy matter to be printed by the press output device, the encompassed segments having a first end segment and a second end segment;

calculating color density variations for at least a portion of the plurality of segment solid density color values; and calculating, in response to the offset values and at least a portion of the color density variations, adjustment data for at least one of the ink fountain zone controls, the adjustment data operable to be used to adjust ink deliverable by the ink fountain zone control.

50. The method of claim 49, wherein calculating the adjustment data further comprises:

identifying a center location of a first virtual ink fountain zone control that corresponds to a center of the first end segment and a center location of a second virtual ink fountain zone control that corresponds to a center of the second end segment;

designating in response to the offset values virtual ink fountain zone control numbers, each of which correspond to one of the at least a portion of segment solid density color values; and interpolating color density variations associated with the at least one of the ink fountain zone controls, in response to a portion of the virtual ink fountain zone control numbers and the color density variations for the at least a portion of the plurality of segment solid density color values, to create the adjustment data.

51. The method of claim 49, wherein the color density variations are calculated as a difference in response to predetermined solid major density aimpoints.

52. The method of claim 49, wherein the virtual ink fountain zone controls are each calculated as an interpolated distance between two of the plurality of ink fountain zone controls.

53. The method of claim 49, further comprising determining whether at least one of the adjustment values is within a desired tolerance.

54. The method of claim 49, wherein the width is adjustable.

* * * * *